US012057646B2

(12) United States Patent
Zekios et al.

(10) Patent No.: US 12,057,646 B2
(45) Date of Patent: Aug. 6, 2024

(54) DECOUPLED MULTI-BAND MICROSTRIP PATCH ANTENNAS

(71) Applicants: Constantinos L. Zekios, Miami, FL (US); Stavros Georgakopoulos, Miami, FL (US); Nicholas E. Russo, Miami, FL (US)

(72) Inventors: Constantinos L. Zekios, Miami, FL (US); Stavros Georgakopoulos, Miami, FL (US); Nicholas E. Russo, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 212 days.

(21) Appl. No.: 17/810,889

(22) Filed: Jul. 6, 2022

(65) Prior Publication Data

US 2024/0213682 A1 Jun. 27, 2024

Related U.S. Application Data

(60) Provisional application No. 63/218,743, filed on Jul. 6, 2021.

(51) Int. Cl.
*H01Q 9/04* (2006.01)
*H01Q 5/378* (2015.01)

(52) U.S. Cl.
CPC ........... *H01Q 9/0421* (2013.01); *H01Q 5/378* (2015.01)

(58) Field of Classification Search
CPC ............................. H01Q 9/0421; H01Q 5/378
See application file for complete search history.

(56) References Cited

U.S. PATENT DOCUMENTS

| | | | | |
|---|---|---|---|---|
| 11,223,141 B2 * | 1/2022 | Liu | H01Q 21/061 |
| 2014/0203995 A1 * | 7/2014 | Romney | H01Q 21/065 343/893 |
| 2018/0323509 A1 * | 11/2018 | Ogawa | H01Q 21/065 |
| 2019/0165476 A1 * | 5/2019 | Hong | H01Q 21/065 |
| 2021/0098894 A1 * | 4/2021 | Haviv | H01Q 21/062 |
| 2021/0210854 A1 * | 7/2021 | Bai | H01Q 5/307 |

* cited by examiner

*Primary Examiner* — Seung H Lee
(74) *Attorney, Agent, or Firm* — Saliwanchik, Lloyd & Eisenschenk

(57) ABSTRACT

Multi-band, microstrip patch antennas, as well as methods of fabricating the same and methods of using the same, are provided. A decoupling technique can be used where strategically etched slots are provided between the tightly coupled microstrip patch antennas, and the appropriate mode excitation of the corresponding patch antennas can be used. The antennas have high isolation between the frequency bands of operation. Multi-band operation can be achieved by exciting a different mode on each contiguous portion of the patch antenna.

20 Claims, 17 Drawing Sheets

DECOUPLED MULTI-BAND MICROSTRIP PATCH ANTENNAS

CROSS-REFERENCE TO RELATED APPLICATION

The application claims the benefit of U.S. Provisional Application Ser. No. 63/218,743, filed Jul. 6, 2021, which is hereby incorporated by reference herein in its entirety, including any figures, tables, and drawings.

GOVERNMENT SUPPORT

This invention was made with government support under FA9550-18-1-0191 awarded by Air Force Office of Scientific Research (AFOSR). The government has certain rights in the invention.

BACKGROUND

Microstrip antennas (MSAs), introduced in 1953, and developed in the 1970s, exhibit many advantages including low profile, small volume, and easy as well as low cost printed circuit board (PCB) fabrication. Numerous designs have been introduced for various applications. Among these designs, MSAs that provide dual-band, multi-band, or wide-band operation have been studied, especially with the rapid development of mobile communication systems. Different approaches have been used to achieve these characteristics, such as slots, multiple elements, and parasitic elements. However, existing designs that provide isolation between feeds have high levels of complexity.

BRIEF SUMMARY

Embodiments of the subject invention provide novel and advantageous multi-band antennas (e.g., microstrip patch antennas), as well as methods of fabricating the same and methods of using the same. A decoupling technique can be used to design and fabricate multi-mode, multi-band, electrically compact, microstrip patch antennas (e.g., rectangular microstrip patch antennas). Strategically etched slots can be provided between the tightly coupled microstrip patch antennas, and the appropriate mode excitation of the corresponding patch antennas can be used. The antennas have high isolation between the frequency bands of operation. Multi-band operation can be achieved by exciting a different mode on each contiguous portion of the patch antenna. The antennas can be multi-mode, multi-band patch antennas that are electrically compact, low-profile, and simple to design and fabricate as compared to related approaches that use complex, large, and/or absorptive decoupling structures.

In an embodiment, a multi-band antenna can comprise: a substrate; a first patch antenna disposed on an upper surface of the substrate; a second patch antenna disposed on the upper surface of the substrate and physically separated from the first patch antenna by a gap; a first connector for connecting to an external power source or a load; a second connector for connecting to the external power source or the load; a first conductive line disposed on the upper surface of the substrate, the first conductive line being in direct physical contact with the first patch antenna and the first connector, and the first conductive line electrically connecting the first patch antenna and the first connector; and a second conductive line disposed on the upper surface of the substrate, the second conductive line being in direct physical contact with the second patch antenna and the second connector, and the second conductive line electrically connecting the second patch antenna and the second connector. The first patch antenna, the second patch antenna, the first conductive line, the second conductive line, the first connector, and/or the second conductor can be made of the same material (e.g., a conductive metal such as copper, gold, aluminum, silver, platinum, palladium, or a combination thereof). A cross-section of the first patch antenna (taken in a first plane parallel to the upper surface of the substrate) can have a rectangular shape and/or a cross-section of the second patch antenna (taken in the first plane) can have a rectangular shape. The first patch antenna can comprise four sides including a first side facing the second patch antenna and being closest to the second patch antenna out of the four sides of the first patch antenna; the second patch antenna can comprise four sides including a second side facing the first patch antenna and being closest to the first patch antenna out of the four sides of the second patch antenna; and a length of the first side of the first patch antenna can be equal to a length of the second side of the second patch antenna. The gap can be a smallest distance between the first patch antenna and the second patch antenna, measured in a first direction parallel to the upper surface of the substrate. A length of the first patch antenna, measured in the first direction, can be larger (e.g., at least 2, 3, 4, 5, 6, 7, 8, 9, 10, or more times larger) than the gap, and a length of the second patch antenna, measured in the first direction, can be larger (e.g., at least 2, 3, 4, 5, 6, 7, 8, 9, 10, or more times larger) than the gap. The length of the first patch antenna, measured in the first direction, can be larger (e.g., at least 1.1, 1.15, 1.2, 1.25, 1.3, 1.333, 1.35, 1.4, 1.45, 1.5, 1.6, 1.7, 1.75, 1.8, 1.9, 2 or more times larger) than the length of the second patch antenna, measured in the first direction. The substrate can comprise a first edge, a second edge adjacent to the first edge, a third edge opposite from the first edge and adjacent to the second edge, and a fourth edge adjacent to the third edge and the first edge and opposite from the second edge; the first connector can be disposed at the first edge of the substrate; the second connector can be disposed at the second edge of the substrate; the first conductive line can extend from the first patch antenna towards the first edge of the substrate; and the second conductive line can extend from the second patch antenna towards the second edge of the substrate. The first conductive line can extend such that it is parallel (or substantially parallel) to the second edge of the substrate and the fourth edge of the substrate, and the second conductive line can extend such that it is parallel (or substantially parallel) to the first edge of the substrate and the third edge of the substrate. The multi-band antenna can operate in a first band of operation when the first connector is connected to the external power source and the second connector is connected to the load, and the multi-band antenna can operate in a second band of operation when the first connector is connected to the load and the second connector is connected to the external power source. The multi-band antenna can comprise one or more unit cells capable of operating (and/or configured to operate) independently of each other, and each unit cell can comprise exactly two patch antennas, exactly three patch antennas, exactly four patch antennas, no more than three patch antennas, or no more than four patch antennas.

In another embodiment, a multi-band antenna can comprise: a substrate; a first patch antenna disposed on an upper surface of the substrate; a second patch antenna disposed on the upper surface of the substrate and physically separated from the first patch antenna by a first gap; a third patch antenna disposed on the upper surface of the substrate and physically separated from the second patch antenna by a second gap; a fourth patch antenna disposed on the upper surface of the substrate and physically separated from the third patch antenna by a third gap and physically separated from the first patch antenna by a fourth gap; a first connector for connecting to an external power source or a load; a second connector for connecting to the external power source or the load; a third connector for connecting to the external power source or the load; a fourth connector for connecting to the external power source or the load; a first conductive line disposed on the upper surface of the substrate, the first conductive line being in direct physical contact with the first patch antenna and the first connector, and the first conductive line electrically connecting the first patch antenna and the first connector; a second conductive line disposed on the upper surface of the substrate, the second conductive line being in direct physical contact with the second patch antenna and the second connector, and the second conductive line electrically connecting the second patch antenna and the second connector; a third conductive line disposed on the upper surface of the substrate, the third conductive line being in direct physical contact with the third patch antenna and the third connector, and the third conductive line electrically connecting the third patch antenna and the third connector; and a fourth conductive line disposed on the upper surface of the substrate, the fourth conductive line being in direct physical contact with the fourth patch antenna and the fourth connector, and the fourth conductive line electrically connecting the fourth patch antenna and the fourth connector. The first patch antenna, the second patch antenna, the third patch antenna, the fourth patch antenna, the first conductive line, the second conductive line, the third conductive line, the fourth conductive line, the first connector, the second connector, the third connector, and/or the fourth connector can be made of the same material (e.g., a conductive metal such as copper, gold, aluminum, silver, platinum, palladium, or a combination thereof). A cross-section of the first patch antenna (taken in a first plane parallel to the upper surface of the substrate) can have a rectangular shape, a cross-section of the second patch antenna (taken in the first plane) can have a rectangular shape, a cross-section of the third patch antenna (taken in the first plane) can have a rectangular shape, and/or a cross-section of the fourth patch antenna (taken in the first plane) can have a rectangular shape. The first patch antenna can comprise four sides including a first side facing the second patch antenna and being closest to the second patch antenna out of the four sides of the first patch antenna, and a second side facing the fourth patch antenna and being closest to the fourth patch antenna out of the four sides of the first patch antenna; the second patch antenna can comprise four sides including a third side facing the first patch antenna and being closest to the first patch antenna out of the four sides of the second patch antenna, and a fourth side facing the third patch antenna and being closest to the third patch antenna out of the four sides of the second patch antenna; the third patch antenna can comprise four sides including a fifth side facing the second patch antenna and being closest to the second patch antenna out of the four sides of the third patch antenna, and a sixth side facing the fourth patch antenna and being closest to the fourth patch antenna out of the four sides of the third patch antenna; and the fourth patch antenna can comprise four sides including a seventh side facing the third patch antenna and being closest to the third patch antenna out of the four sides of the fourth patch antenna, and an eight side facing the first patch antenna and being closest to the first patch antenna out of the four sides of the fourth patch antenna. A length of the first side of the first patch antenna can be equal to a length of the third side of the second patch antenna, a length of the fourth side of the second patch antenna can be equal to a length of the fifth side of the third patch antenna, a length of the sixth side of the third patch antenna can be equal to a length of the seventh side of the fourth patch antenna, and/or a length of the eighth side of the fourth patch antenna can be equal to a length of the second side of the first patch antenna. The first gap can be a smallest distance between the first patch antenna and the second patch antenna, measured in a first direction parallel to the upper surface of the substrate; the second gap can be a smallest distance between the second patch antenna and the third patch antenna, measured in a second direction parallel to the upper surface of the substrate; the third gap can be a smallest distance between the third patch antenna and the fourth patch antenna, measured in the first direction; and the fourth gap can be a smallest distance between the fourth patch antenna and the first patch antenna, measured in the second direction. A length of the first patch antenna, measured in the first direction, can be larger (e.g., at least 2, 3, 4, 5, 6, 7, 8, 9, 10, or more times larger) than the first gap; a length of the second patch antenna, measured in the first direction, can be larger (e.g., at least 2, 3, 4, 5, 6, 7, 8, 9, 10, or more times larger) than the first gap; a length of the second patch antenna, measured in the second direction, can be larger (e.g., at least 2, 3, 4, 5, 6, 7, 8, 9, 10, or more times larger) than the second gap; a length of the third patch antenna, measured in the second direction, can be larger (e.g., at least 2, 3, 4, 5, 6, 7, 8, 9, 10, or more times larger) than the second gap; a length of the third patch antenna, measured in the first direction, can be larger (e.g., at least 2, 3, 4, 5, 6, 7, 8, 9, 10, or more times larger) than the third gap; a length of the fourth patch antenna, measured in the first direction, can be larger (e.g., at least 2, 3, 4, 5, 6, 7, 8, 9, 10, or more times larger) than the third gap; a length of the fourth patch antenna, measured in the second direction, can be larger (e.g., at least 2, 3, 4, 5, 6, 7, 8, 9, 10, or more times larger) than the fourth gap; and/or a length of the first patch antenna, measured in the first direction, can be larger (e.g., at least 2, 3, 4, 5, 6, 7, 8, 9, 10, or more times larger) than the fourth gap. The length of the first patch antenna, measured in the first direction, can be larger (e.g., at least 1.1, 1.15, 1.2, 1.25, 1.3, 1.333, 1.35, 1.4, 1.45, 1.5, 1.6, 1.7, 1.75, 1.8, 1.9, 2 or more times larger) than the length of the second patch antenna, measured in the first direction; the length of the fourth patch antenna, measured in the first direction, can be larger (e.g., at least 1.1, 1.15, 1.2, 1.25, 1.3, 1.333, 1.35, 1.4, 1.45, 1.5, 1.6, 1.7, 1.75, 1.8, 1.9, 2 or more times larger) than the length of the third patch antenna, measured in the first direction; the length of the first patch antenna, measured in the first direction, can be the same (or about the same) as the length of the fourth patch antenna, measured in the first direction; the length of the second patch antenna, measured in the first direction, can be the same (or about the same) as the length of the third patch antenna, measured in the first direction; the length of the first patch antenna, measured in the second direction, can be the same (or about the same) as the length of the second patch antenna, measured in the second direction; the length of the third patch antenna, measured in the second direction, can be the same (or about the same) as the length of the fourth patch antenna, measured in the second direction; the length of the first patch antenna, measured in the second direction, can be larger (e.g., at least 1.1, 1.15, 1.2, 1.25, 1.3, 1.333, 1.35, 1.4, 1.45, 1.5, 1.6, 1.7, 1.75, 1.8, 1.9, 2 or more times larger) than the length of the fourth patch antenna, measured in the second direction; and/or the length of the second patch antenna, measured in the second direction, can be larger (e.g., at least 1.1, 1.15, 1.2, 1.25, 1.3, 1.333, 1.35, 1.4, 1.45, 1.5, 1.6, 1.7, 1.75, 1.8, 1.9, 2 or more times larger) than the length of the third patch antenna, measured in the second direction. The substrate can comprise a first edge, a second edge adjacent to the first edge, a third edge opposite from the first edge and adjacent to the second edge, and a fourth edge adjacent to the third edge and the first edge and opposite from the second edge; the first connector, the second connector, the third connector, and the fourth connector can be disposed at the first edge, the second edge, the third edge, and the fourth edge, respectively, of the substrate; the first conductive line can extend from the first patch antenna towards the first edge of the substrate; the second conductive line can extend from the second patch antenna towards the second edge of the substrate; the third conductive line can extend from the third patch antenna towards the third edge of the substrate; and the fourth conductive line can extend from the fourth patch antenna towards the fourth edge of the substrate. The first conductive line can extend such that it is parallel (or substantially parallel) to the second edge of the substrate and the fourth edge of the substrate; the second conductive line can extend such that it is parallel (or substantially parallel) to the first edge of the substrate and the third edge of the substrate; the third conductive line can extend such that it is parallel (or substantially parallel) to the second edge of the substrate and the fourth edge of the substrate; and the fourth conductive line can extend such that it is parallel (or substantially parallel) to the first edge of the substrate and the third edge of the substrate. The multi-band antenna can operate in a first band of operation when the second connector is connected to the load and the first connector is connected to the external power source; the multi-band antenna can operate in a second band of operation when the first connector is connected to the load and the second connector is connected to the external power source; the multi-band antenna can operate in a third band of operation when the second connector is connected to the load and the third connector is connected to the external power source; and the multi-band antenna can operate in a fourth band of operation when the third connector is connected to the load and the fourth connector is connected to the external power source. The multi-band antenna can comprise one or more unit cells capable of operating (and/or configured to operate) independently of each other, and each unit cell can comprise exactly four patch antennas.

In another embodiment, a method of fabricating a multi-band antenna can comprise: disposing a patch antenna material on a substrate; and etching a gap in the patch antenna material to give a first patch antenna and a second patch antenna with the gap physically separating the first patch antenna from the second patch antenna. The method can further comprise forming a first conductive line, a second conductive line, a first connector, and/or a second connector having the features disclosed herein. The multi-band antenna can have any of the features disclosed herein.

In another embodiment, a method of fabricating a multi-band antenna can comprise: disposing a patch antenna material on a substrate; etching a first gap, a second gap, a third gap, and a fourth gap in the patch antenna material to give a first patch antenna, a second patch antenna, a third patch antenna, and a fourth patch antenna, with the first gap physically separating the first patch antenna from the second patch antenna, the second gap physically separating the second patch antenna from the third patch antenna, the third gap physically separating the third patch antenna from the fourth patch antenna, and the fourth gap physically separating the fourth patch antenna from the first patch antenna. The method can further comprise forming a first conductive line, a second conductive line, a third conductive line, a fourth conductive line, a first connector, a second connector, a third connector, and/or a fourth connector having the features disclosed herein. The multi-band antenna can have any of the features disclosed herein.

BRIEF DESCRIPTION OF DRAWINGS

FIG. 1(*b*) is a schematic view of a patch antenna design with a y-oriented slot, according to an embodiment of the subject invention.

FIG. 2(*b*) shows equivalent magnetic currents on the side periphery of a patch antenna operating in the $TM_{010}$ mode.

FIG. 2(*c*) shows equivalent magnetic currents on a first section of the patch antenna (of FIGS. 2(*a*) and 2(*b*)) that operates in the $TM_{100}$ mode.

FIG. 2(*d*) shows image theory for an equivalent magnetic current tangential to a Perfect Magnetic Conductor (PMC) boundary.

FIG. 2(*e*) shows equivalent magnetic currents on both sections of the patch after the PMC boundary has been replaced using image theory.

FIG. 2(*f*) shows equivalent magnetic currents on a first section of the patch antenna (of FIGS. 2(*a*) and 2(*b*)) that operates in the $TM_{010}$ mode.

FIG. 2(*g*) shows image theory for an equivalent magnetic current perpendicular to a PMC boundary.

FIG. 2(*h*) shows equivalent magnetic currents on both sections of the patch after the PMC boundary has been replaced using image theory.

FIG. 3(*b*) shows a jointly fed microstrip antenna (JFMSA) design. All dimensions are for exemplary purposes only, should not be construed as limiting, and are given in mm. The equivalent $M_{eq}$(bar) and $J_{surf}$(bar) current densities for the low-band are shown.

FIG. 3(*c*) shows a separately fed microstrip antenna (SFMSA) design. All dimensions are for exemplary purposes only, should not be construed as limiting, and are given in mm. The equivalent $M_{eq}$(bar) and $J_{surf}$(bar) current densities for the low-band are shown.

FIG. 3(*d*) shows the CMSA of FIG. 3(*a*), with the equivalent $M_{eq}$(bar) and $J_{surf}$(bar) current densities for the high-band.

FIG. 3(*e*) shows the JFMSA of FIG. 3(*b*), with the equivalent $M_{eq}$(bar) and $J_{surf}$(bar) current densities for the high-band.

FIG. 3(*f*) shows the SFMSA of FIG. 3(*c*), with the equivalent $M_{eq}$(bar) and $J_{surf}$(bar) current densities for the high-band.

FIG. 9(*b*) simulated and measured gain patterns for an SFMSA operating in the center frequency of the high-band in the φ=90° principal plane (refer to the coordinate system defined in FIG. 3(*c*)).

FIG. 10(*b*) shows a top view of the quad-band antenna of FIG. 10(*a*) with surface electric and equivalent magnetic current densities when operating in the first band.

FIG. 13(*b*) shows simulated and measured gain patterns for a quad-band antenna operating in center frequency of band $B_2$ in the φ=0° principal plane (refer to the coordinate system defined in FIG. 10(*a*)).

FIG. 13(*c*) shows simulated and measured gain patterns for a quad-band antenna operating in center frequency of band $B_3$ in the φ=0° principal plane (refer to the coordinate system defined in FIG. 10(*a*)).

FIG. 13(*d*) shows simulated and measured gain patterns for a quad-band antenna operating in center frequency of band $B_4$ in the φ=0° principal plane (refer to the coordinate system defined in FIG. 10(*a*)).

FIG. 14(*b*) shows surface currents for an antenna when a slot is cut parallel to the radiating edge.

FIG. 15(*b*) shows a bottom view of the quad-band antenna shown in FIG. 15(*a*).

FIG. 15(*c*) shows a magnified view, with representative current distribution of the quad-band antenna shown in FIGS. 15(*a*) and 15(*b*).

FIG. 17(*b*) shows gain patterns of all bands in the H-plane for a quad-band antenna.

DETAILED DESCRIPTION

Embodiments of the subject invention provide novel and advantageous multi-band antennas (e.g., microstrip patch antennas), as well as methods of fabricating the same and methods of using the same. A decoupling technique can be used to design and fabricate multi-mode, multi-band, electrically compact, microstrip patch antennas (e.g., rectangular microstrip patch antennas). Strategically etched slots can be provided between the tightly coupled microstrip patch antennas, and the appropriate mode excitation of the corresponding patch antennas can be used. The antennas have high isolation between the frequency bands of operation. Multi-band operation can be achieved by exciting a different mode on each contiguous portion of the patch antenna. The antennas can be multi-mode, multi-band patch antennas that are electrically compact, low-profile, and simple to design and fabricate as compared to related approaches that use complex, large, and/or absorptive decoupling structures.

The design approach of embodiments of the subject invention uses the coupling properties of slots in order to support the development of simpler and lower cost multi-band antennas. Field equivalence theory and image theory can be used to qualitatively explain the design approach. Extended slots can be used and can cut conventional patches into pieces to achieve high isolation (e.g., on the order of 30 decibels (dB)) between the feeding ports of multi-band and multi-mode microstrip antennas. The effects of the positions and orientations of these slots in both dual- and quad-mode designs are examined. The design approach is simple, and it can be applied to any microstrip antenna design.

An elegant approach is presented for designing multi-band multi-mode rectangular microstrip antennas (MSAs) with high isolation between the bands. The coupling properties of a gap (an extended slot), which is introduced in a rectangular MSA operating in the $TM_{010}$ and $TM_{100}$ modes, can be qualitatively explained through field equivalence theory and image theory. Even though the slot appears "transparent" (i.e., strongly couples the two sections of the MSA) to the $TM_{010}$ mode, it effectively decouples the two sections of the MSA in the $TM_{100}$ mode. As a proof-of-concept, the design technique can be applied to a conventional patch to achieve dual-band operation with 39 dB of measured isolation between the bands. The design concept can then be extended to achieve a quad-band antenna design with 30 dB of measured isolation between all of its bands. Compared to related art designs, embodiments of the subject invention preserve the low-profile of microstrip antennas and provide a simple way to design and fabricate multi-band and multi-mode antennas. They are therefore very well suited for antennas for next generation communication systems.

Figures 1A, 1B:
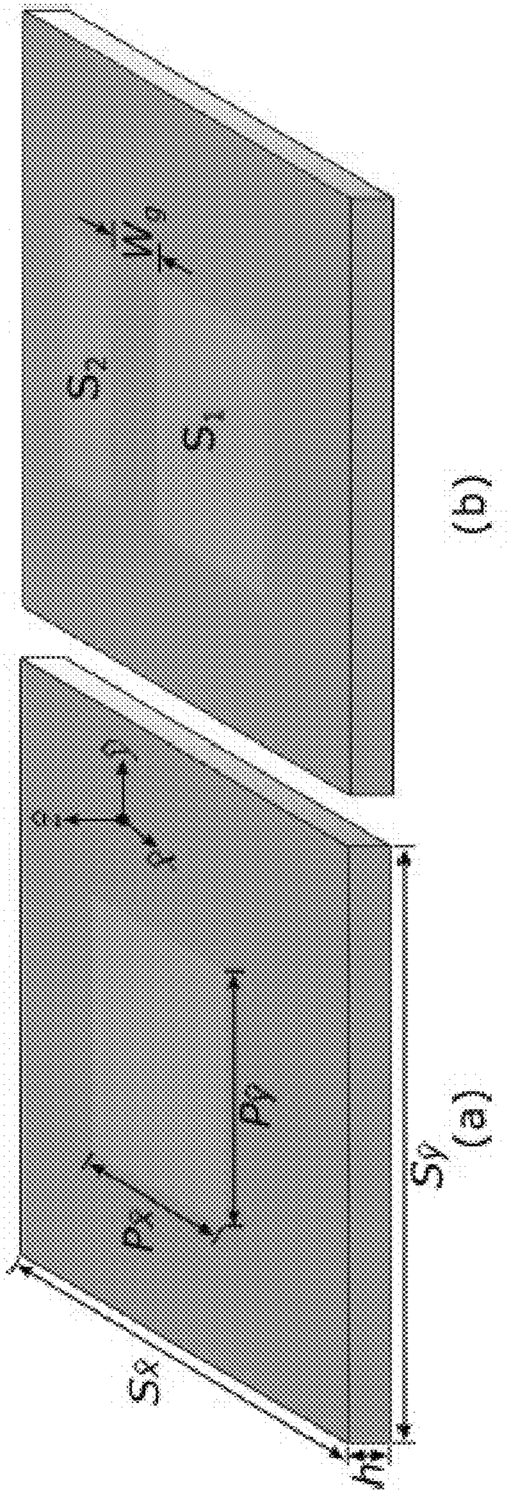
FIG. 1(*a*) is a schematic view of a patch antenna design with conventional geometry.

The design of embodiments of the subject invention can use the coupling properties of slots in microstrip structures. Its physical behavior can be explained using perturbation theory, field equivalence theory, and image theory. For simplicity but without loss of generality, let us assume the case of a rectangular patch antenna with length $P_x$, width $P_y$, and height h, as shown in FIG. 1(*a*). Assuming that $h \ll P_x$, $h \ll P_y$, $P_x > P_y > h$, and $P_x > P_y > P_x/2 > h$, the first two excited modes are $TM_{010}$ and $TM_{100}$.

First, the effects of a slot in the design have to be understood, see FIG. 1(*b*). Based on perturbation theory, the resonant frequency of a structure when a perturbation is introduced changes as: $(\omega-\omega_o)/\omega_o=(\Delta W_m(\text{bar})-\Delta W_e(\text{bar}))/W$, where W is the total stored energy, $\Delta W_m$ is the time-averaged magnetic energy, and $\Delta W_e$ is the time-averaged electric energy, originally contained in the volume $\Delta V$ removed from the original structure ([28]). The circular frequencies of the original and perturbed cavities are defined as $\omega_o$ and $\omega$, respectively. Accordingly, the following two conclusions can be drawn: (a) a small perturbation at a point of large magnetic field (i.e., high $W_m$) will increase the resonant frequency; and (b) a small perturbation made at a point of large electric field (i.e., high $W_e$) will decrease the resonant frequency.

The next step is to examine how the slot affects the radiation characteristics of the design based on the assumption that the patch operates at the $TM_{010}$ and $TM_{100}$ modes. Using the Field Equivalence Principle, equivalent surface electric $J_s$(bar)=n(hat)×H (bar), and magnetic $M_s$(bar)=−n (hat)×E(bar) currents can be found at the surface of the cavity. As explained in detail in (which is hereby incorporated by reference herein in its entirety), only the equivalent magnetic currents remain on the side periphery of the cavity as shown in FIGS. 2(*a*) and 2(*b*).

Let us now introduce a slot in the design that cuts the microstrip antenna in two sections, $S_1$ and $S_2$, as shown in FIG. 1(*b*). Assuming that the slot width $W_g\rightarrow 0$, the slot can be replaced by an equivalent plane that behaves as a Perfect Magnetic Conductor (PMC). Let section one, $S_1$, of the patch operate in the $TM_{100}$ mode (FIG. 2(*a*)). By the field equivalence principle, equivalent magnetic currents can be found on the front and back faces of $S_1$ as shown in FIG. 2(*c*). Utilizing image theory, the PMC plane can be replaced by two anti-parallel currents, as shown in FIG. 2(*d*). Based on this result the corresponding current is induced on section $S_2$ as shown in FIG. 2(*e*). As expected the anti-parallel currents on either side of the slot cancel each other. Consequently, using the field equivalence principle no fields (or negligible fields) are excited at patch $S_2$. Thus, the appearance or absence of patch $S_2$ has no effect on the design.

Figures 2A, 2B, 2C, 2D, 2E, 2F, 2G, 2H:
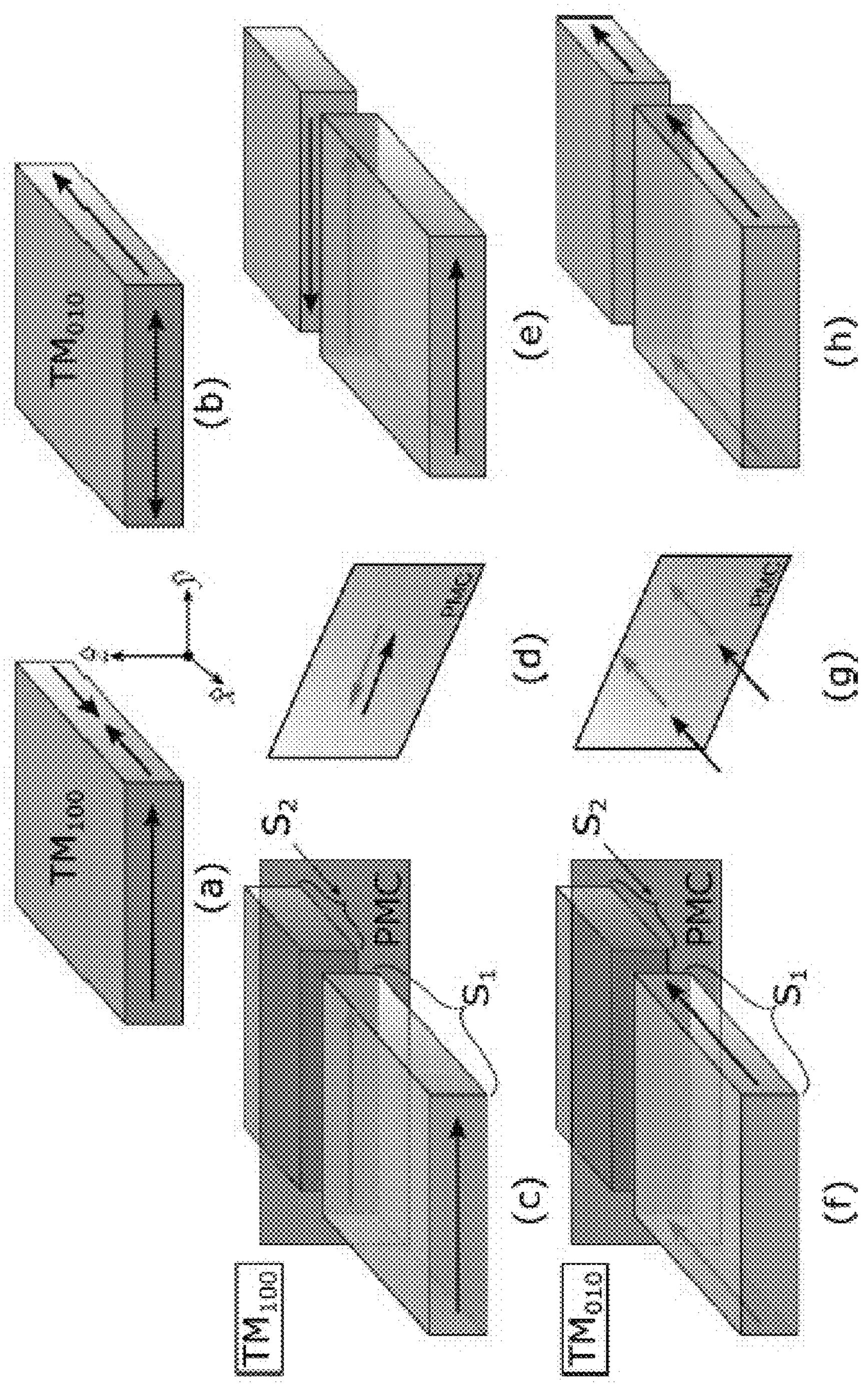
FIG. 2(*a*) shows equivalent magnetic currents on the side periphery of a patch antenna operating in the $TM_{100}$ mode.

The same approach can be followed to understand the behavior of the patch when section one, $S_1$, of the patch, operates at the $TM_{010}$ mode (FIG. 2(*b*)). By the field equivalence principle equivalent magnetic currents can be found on the side faces of $S_1$ as shown in FIG. 2(*f*). Utilizing image theory, the PMC plane can be replaced by two co-linear currents, as shown in FIG. 2(*g*). Based on this result the corresponding current is induced on section $S_2$ as shown in FIG. 2(*h*). Using the field equivalence principle, the co-linear currents generate fields on patch $S_2$. Therefore, for the case of the $TM_{010}$ mode, the appearance or absence of patch $S_2$ can significantly affect the design and cannot be ignored.

In summary, based on the above qualitative analysis, the following can be concluded when an electrically narrow slot is cut into a patch: (a) in the case of the $TM_{100}$ mode, the two sections of the patch, $S_1$ and $S_2$, are highly isolated and patch $S_2$ contributes negligible radiation; and (b) in the case of $TM_{010}$ mode, the two sections of the patch, $S_1$ and $S_2$, are strongly coupled and behave as if they are electrically connected. These conclusions can be used to develop a methodology for designing dual-band and quad-band microstrip antennas that exhibit high isolation between their bands.

Figures 14A, 14B:
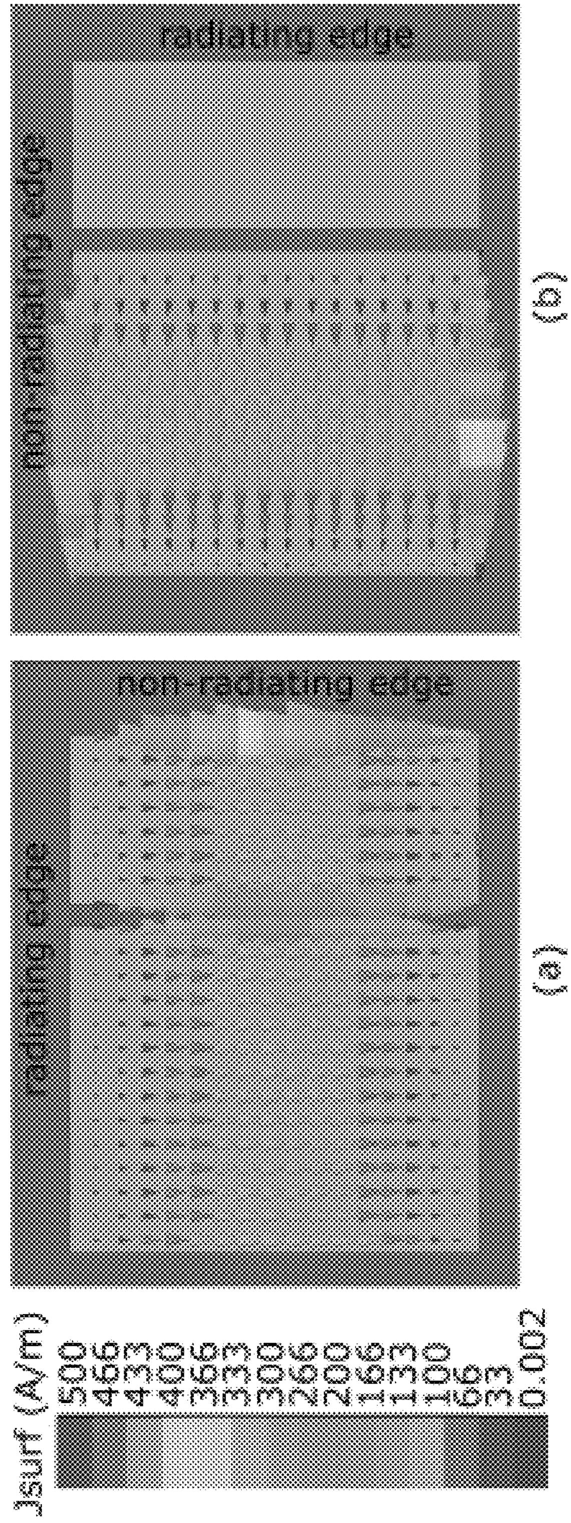
FIG. 14(*a*) shows surface currents for an antenna when a slot is cut parallel to the non-radiating edge.

In an embodiment, a quad-band patch can be used as a multiple-in, multiple-out (MIMO) antenna (see FIGS. 14(*a*)-15(*c*)). Unlike related art designs, the proposed design can be simple and can be used for any frequency range. The antenna can be used as, for example, a base station antenna, and it can be designed to operate in, for example, the 700 MHz block C and/or block B11 bands as well as in the 1.35 GHz and/or 2.07 GHz bands, though embodiments are not limited thereto.

In some embodiments, a quad-band patch can operate in four bands of operation. Referring to the labeling shown in FIG. 10(*a*), which are for exemplary purposes only, a first band of operation can include strong coupling between patches 1 and 4 (with no coupling between any other patches), a second band of operation can include strong coupling between patches 1 and 2 (with no coupling between any other patches), a third band of operation can include strong coupling between patches 2 and 3 (with no coupling between any other patches), and a fourth band of operation can include strong coupling between patches 3 and 4 (with no coupling between any other patches). The band of operation can be determined by, for example, providing power to a particular patch and/or attaching a load to a particular patch (e.g., the first band of operation can be achieved by providing power to patch 1 and attaching a load to patch 4 (or vice versa), the second band of operation can be achieved by providing power to patch 2 and attaching a load to patch 1 (or vice versa), the third band of operation can be achieved by providing power to patch 3 and attaching a load to patch 2 (or vice versa), and the fourth band of operation can be achieved by providing power to patch 4 and attaching a load to patch 3 (or vice versa)).

In another embodiment, a method of using a multi-band antenna can comprise providing a multi-band antenna (e.g., a dual-band antenna or a quad-band antenna) as disclosed herein and connecting a load and an external power source to the multi-band antenna to operate the multi-band antenna in a mode of operation as desired.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1

Figures 3A, 3B, 3C, 3D, 3E, 3F:
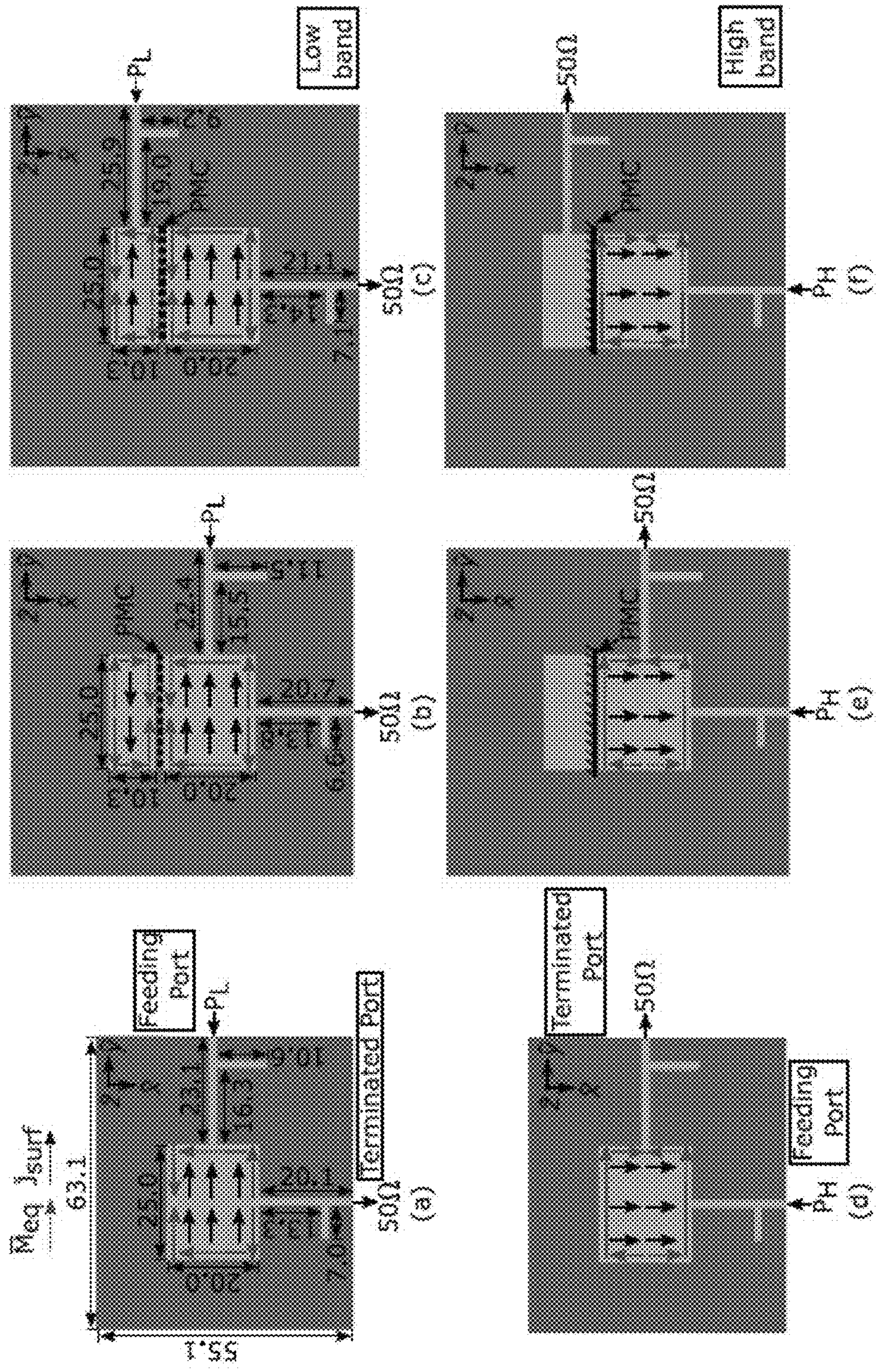
FIG. 3(*a*) shows a conventional microstrip antenna (CMSA) design. All dimensions are for exemplary purposes only, should not be construed as limiting, and are given in millimeters (mm). The equivalent surface magnetic ($M_{eq}$ (bar)) and electric ($J_{surf}$(bar)) current densities for the low-band are shown.

The decoupling technique of embodiments of the subject invention was applied to a dual-band conventional MSA (CMSA) as shown in FIG. 3(*a*), which operates in the 3.36 gigahertz (GHz)-3.39 GHz band (low-band) and the 4.16 GHz-4.2 GHz band (high-band). All antennas physically fabricated and tested (e.g., for the examples) used 0.76 millimeter (mm) thick Rogers RO3003 substrate with $\varepsilon_r$+j tan δ=3+j0.0013. Further, all 50 Ohm (Ω) ports, $P_L$ and $P_H$, were impedance matched to the MSA using a single stub. These substrates and impedance matching are for exemplary purposes only and should not be construed as limiting.

ANSYS HFSS was used to simulate antenna performance and calculate the surface electric, $J_{surf}$(bar), and equivalent magnetic currents, $M_{eq}$(bar). The operation of the CMSA is described as follows. As shown by FIG. 3(*a*), port $P_L$ excites the $TM_{010}$ mode (compare with FIG. 2(*b*)) in the low-band, while port $P_H$ is terminated in a matched load. In this case, the $P_y$ dimension (25 mm) acts as the non-radiating edge, which dictates the low-band resonant frequency. On the other hand, as demonstrated in FIG. 3(*d*), port $P_H$ excites the $TM_{100}$ mode (compare with FIG. 2(*a*)) in the high-band, while port $P_L$ is terminated in a matched load. In this case, the $P_x$ dimension (20 mm) acts as the non-radiating edge, which dictates the high-band resonant frequency. Therefore, the two modes of the CMSA can be designed to work at any two frequency bands by independently selecting their respective non-radiating dimensions.

The decoupling technique is applied to decouple the two modes of operation (i.e., two bands) of this antenna. This is achieved by first extending the original length of the CMSA, $P_x$, from 20 mm to 31.65 mm. Despite this extended length, we will continue to assume that the antenna operates in the $TM_{010}$ and $TM_{100}$ modes in the low- and high-bands, respectively. This extended length increases the radiating dimension in low-band operation ($TM_{010}$ mode), which reduces the input impedance of the patch at its feeding port $P_L$ according to Equation (1). Further, it increases the non-radiating dimension in high-band operation ($TM_{100}$ mode), which based on $f_r \cong c/(2P_{\hat{x}}\sqrt{\varepsilon_r})$, reduces the resonant frequency of the patch.

$$R_{in} = 90\frac{e_r}{pc_1}\epsilon_r\mu_r\left(\frac{P_{\hat{y}}}{P_{\hat{x}}}\right)^2\sin^2\left(\frac{\pi x_f}{P_{\hat{y}}}\right) \tag{1}$$

All variables of Equation (1) are defined in [30] (which is hereby incorporated by reference herein in its entirety). Based on the conclusions summarized herein, a y-oriented slot introduced into the lengthened MSA appears "transparent" in low-band operation (compare FIG. 3(*b*) with FIG. 2(*h*)), while it isolates the patch sections in high-band operation (compare FIG. 3(*e*) with FIG. 2(*e*)).

In order to exemplify the decoupling effect of the introduced slot in high-band operation, the equivalent PMC boundary is represented as a solid ground plane (FIGS. 3(*e*)-3(*f*)). On the other hand, the "transparency" of the slot in low-band operation is exemplified by representing the equivalent PMC boundary as a dashed line (FIGS. 3(*b*)-3(*c*)). It should be noted that in this design, shown in FIG. 3(*b*), port $P_L$ is re-positioned along the center of the x dimension of the $S_1$ patch section. Because both ports are directly connected via the patch, this design is named jointly fed MSA (JFMSA). Here, the slot's width is set to 1.35 mm ($0.015\lambda_o$ in the low-band) and is positioned 20 mm from the edge, such that section $S_1$ un-coincidentally has the same dimensions as the CMSA.

In summary, by extending one dimension of a dual-band CMSA and introducing a slot perpendicular to the extended dimension, both its low- and high-band resonant frequencies can be preserved. The simulated performances of the JFMSA and CMSA designs are compared in Table 1 in both the low-band (LB) and high-band (HB) operation in terms of: (a) 10 dB impedance bandwidth (BW); (b) minimum in-band isolation, $I_{min}$; (c) boresight gain ($G_o$); (d) boresight cross polarization level ($XP_o$); and (e) total efficiency ($e_o$).

These results show that the JFMSA does not achieve any significant performance improvements over the CMSA. In fact, the JFMSA has a lower gain (by 1.3 dB) than the CMSA when operating in the low-band. This is attributed to the out-of-phase equivalent magnetic current densities on either side of the slot (see the blue dashed currents perpendicular to the slot in FIG. 3(*b*)), and it is caused by the way port $P_L$ was fed. This shows that design the feeds should be carefully designed to practically decouple the two modes of the CMSA antenna.

In order to improve the low-band gain and isolation, the feed must be modified so it does not alter the performance of the method for decoupling modes. By centering the low-band port ($P_L$) along the x edge of section $S_2$, the equivalent magnetic currents on either side of the slot desirably become in-phase (see the blue dashed currents perpendicular to the slot in FIG. 3(*c*)). Further, as with the JFMSA, both sections of the patch are still effectively decoupled by the slot in high-band operation (compare FIG. 3(*e*) with FIG. 3(*f*)). As each section of the patch is fed by a different port, this design can be named as the separately fed MSA (SFMSA).

Figure 4:
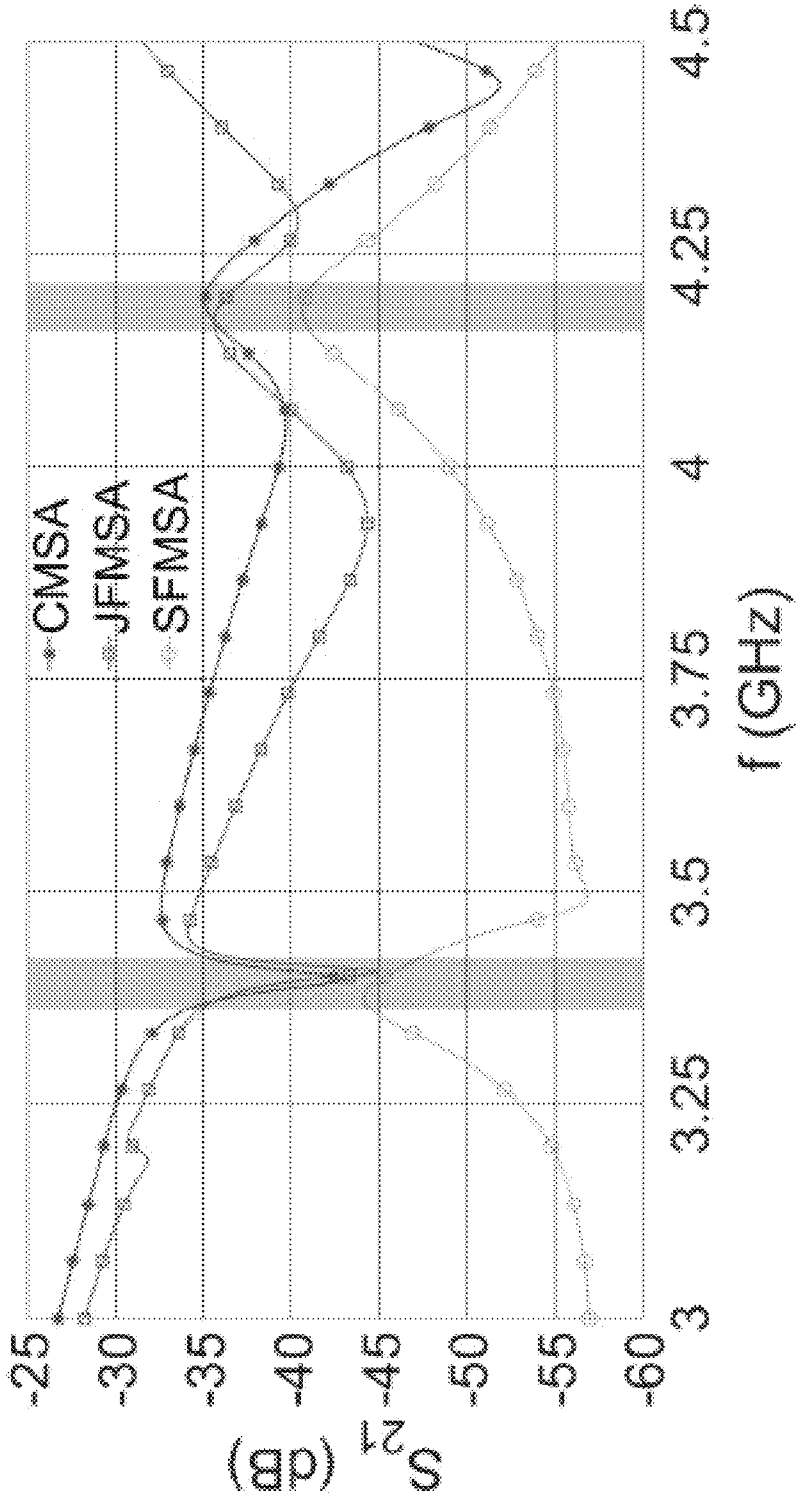
FIG. 4 shows a plot of $S_{21}$ (in decibels (dB)) versus frequency (in gigahertz (GHz)), showing isolation of CMSA, JFMSA, and SFMSA designs.

Table 1 indicates that the SFMSA achieves 6.8 dB and 5.4 dB higher isolation than the CMSA when operating in the low- and high-bands, respectively. The simulated isolations of the CMSA, JFMSA, and SFMSA are plotted versus frequency and compared in FIG. 4. Further, Table 1 indicates that the SFMSA provides improved performance over the CMSA across nearly all parameters. Notably, the CMSA has a 1.2 dB gain difference between the $TM_{010}$ and $TM_{100}$ modes excited in low- and high-band operation, respectively. The SFMSA reduces this difference to 0.7 dB. Also, the low-band BW, gain, and radiation efficiency are reduced as compared to the high-band as the patch is electrically smaller at the low-band ([29]).

TABLE 1

Simulated antenna characteristics.

| Parameter | | CMSA | JFMSA | SFMSA |
|---|---|---|---|---|
| 10 dB BW (MHz) | LB | 20 | 10 | 30 |
| | HB | 40 | 50 | 50 |
| $I_{min}$ (dB) | LB | 37.3 | 36.2 | 44.1 |
| | HB | 35.2 | 35.6 | 40.6 |
| $G_o$ (dB) | LB | 5.3 | 4 | 6 |
| | HB | 6.5 | 6.6 | 6.7 |
| X $P_o$ (dB) | LB | 14.8 | 13.9 | 22.8 |
| | HB | 22.7 | 21.7 | 19.2 |
| $e_o$ % | LB | 70 | 60 | 77 |
| | HB | 84 | 87 | 87 |

The elegance of the SFMSA design lies in its inherent simplicity. In designing an SFMSA from a CMSA, two additional design parameters must be determined, namely, the extended dimension of the MSA, $L_e$, and the width of the introduced slot, $W_g$. Consider the SFMSA design with dimensions given in FIG. 3(*c*). The effect of the extended patch dimension, $L_e$, on the minimum in-band isolation is investigated in FIG. 5. In both bands, as $L_e$ is initially increased, the isolation is improved to a maximum. Beyond this point the isolation fluctuates in the low-band and decreases in the high-band. It was demonstrated that the SFMSA provides improved characteristics over the CMSA at the cost of extended antenna dimension. This example demonstrates that an increase in the dimension of the CMSA by as little as $0.07\lambda_o$ results in 9.9 dB and 5.4 dB higher isolation in the low- and high-bands, respectively.

Figure 5:
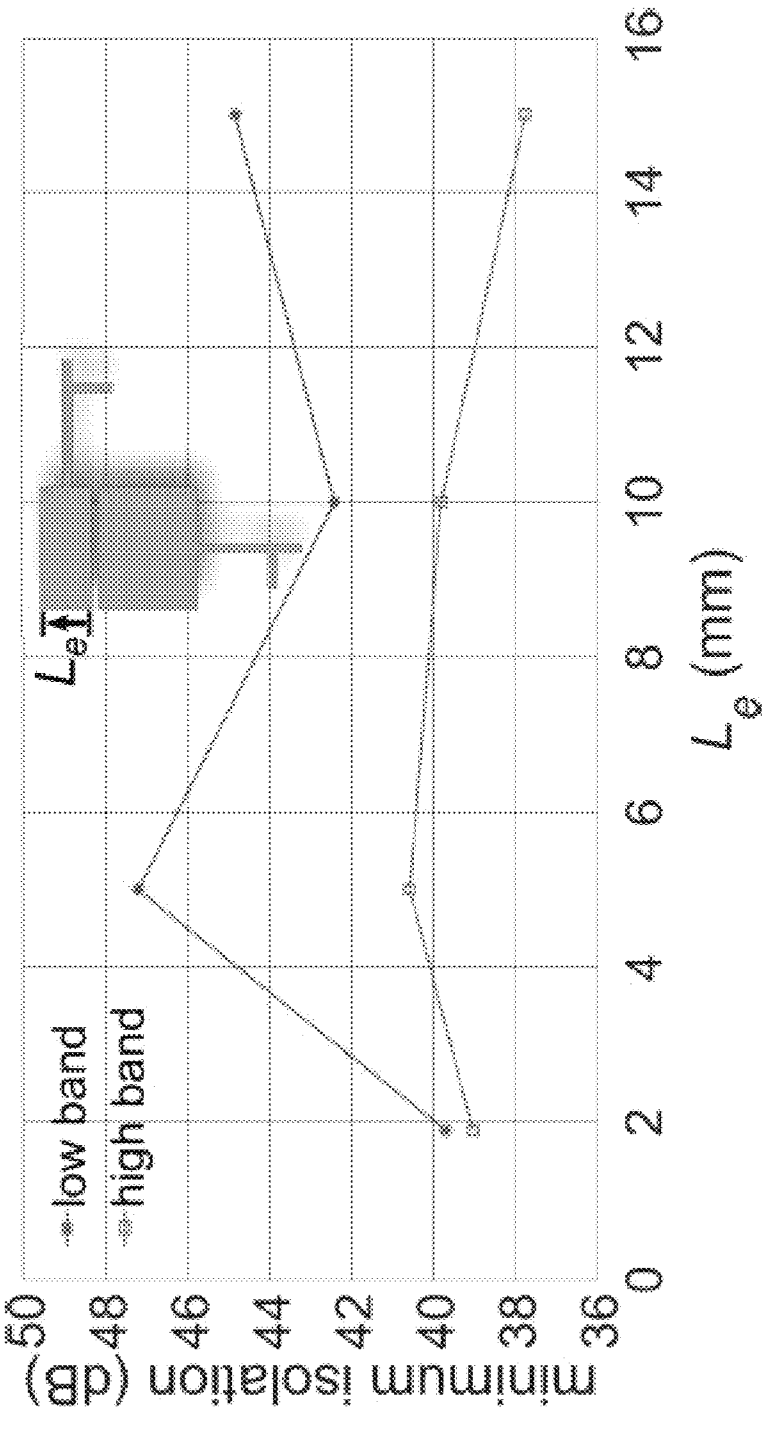
FIG. 5 shows a plot of minimum in-band isolation (in dB) versus extended length ($L_e$, in mm) for an SFMSA. The inset shows how $L_e$ is measured/defined.

Because the extended length ($L_e$) does not affect the non-radiating length of the low-band $TM_{010}$ mode, the low-band resonance is unaffected by the variation of $L_e$, which is presented in FIG. 5. Also, due to the slot's canceling effects in the high-band $TM_{100}$ mode (see FIG. 2(*e*)), the high-band resonance is also unaffected by the variation of $L_e$. Moreover, the gain, cross-polarization, and radiation efficiency remain generally unaffected in both bands as $L_e$ varies.

Figure 6:
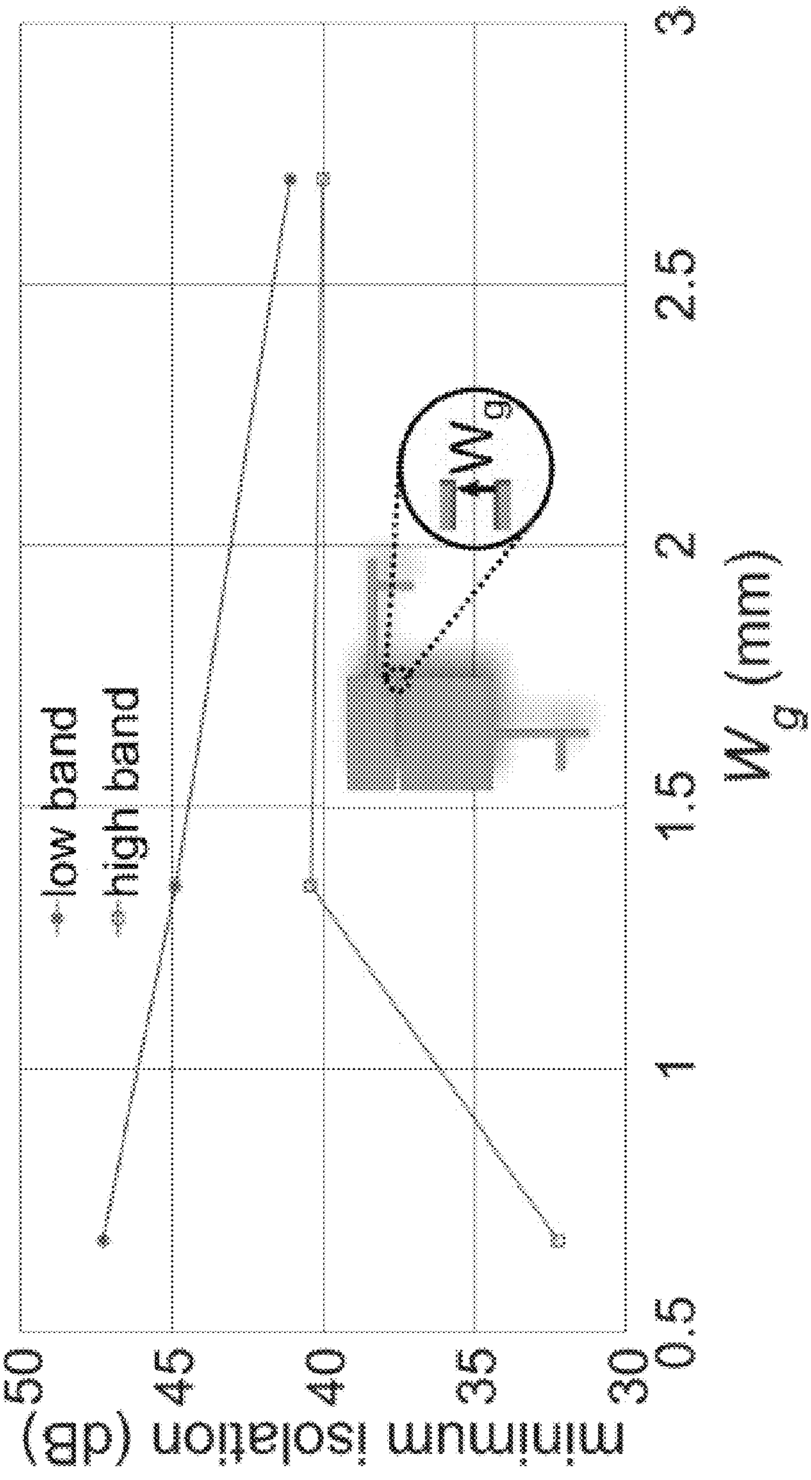
FIG. 6 shows a plot of minimum in-band isolation (in dB) versus slot width ($W_g$, in mm) for an SFMSA. The inset shows how $W_g$ is measured/defined.

Also, the variation of the SFMSA's minimum in-band isolation versus the slot width, $W_g$, is presented in FIG. 6. It is observed that as the width is increased, isolation in the low-band is decreased while isolation in the high-band is increased to the point that the isolation in both bands is approximately equal. Therefore, in the case that the desired isolation in the high-band cannot be achieved by adjusting the extended length ($L_e$) alone, the slot width ($W_g$) may be increased to improve isolation in the high-band at the expense of reduced isolation in the low-band. Notably, the results show that resonant frequency, gain, cross-polarization, and radiation efficiency in both bands remain generally unaffected when the slot width varies in the range shown in FIG. 6.

Based on the above results, it is clear that large extended lengths and slot widths do not provide improved isolation. Therefore, the antenna's dimension needs to only slightly increase to achieve a significantly higher isolation between the two modes of operation.

Figure 7:
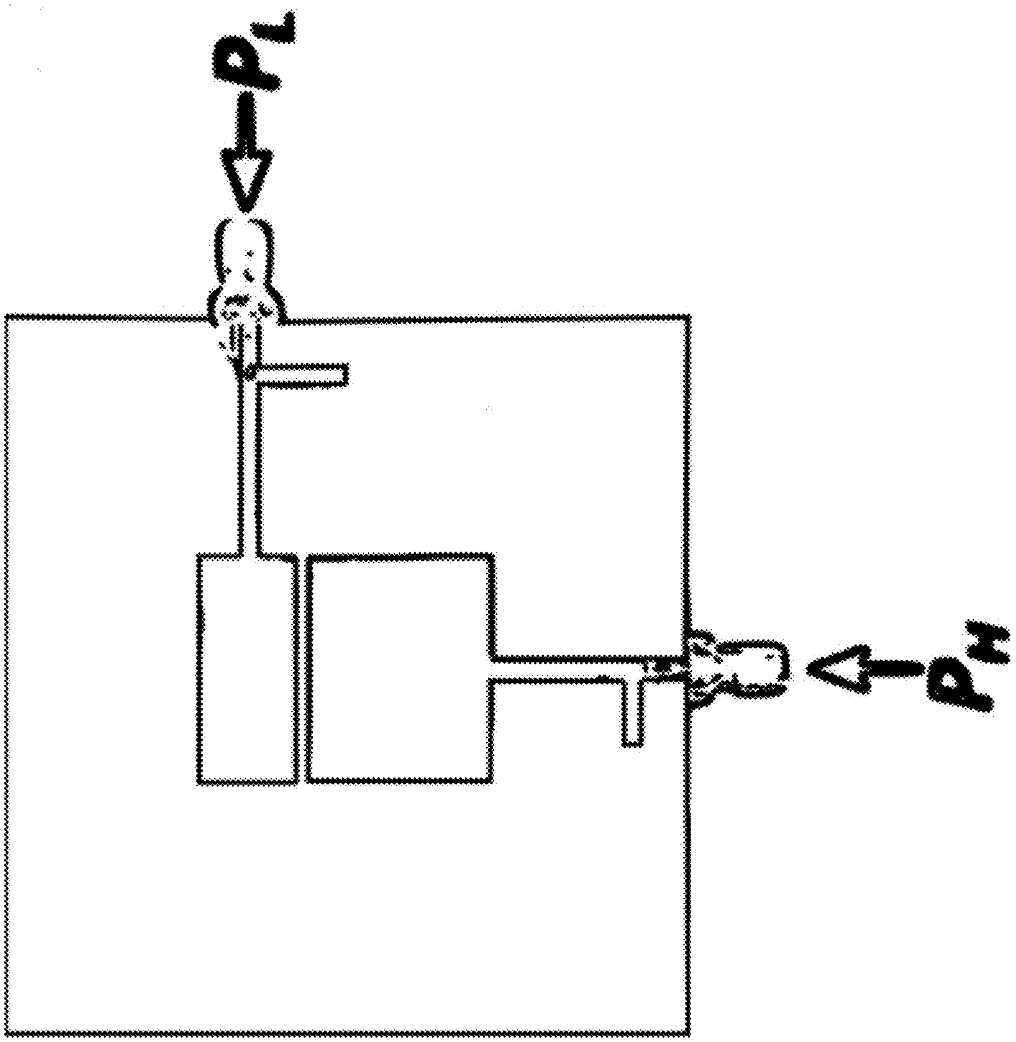
FIG. 7 shows an image of a fabricated SFMSA, according to an embodiment of the subject invention.
Figure 8:
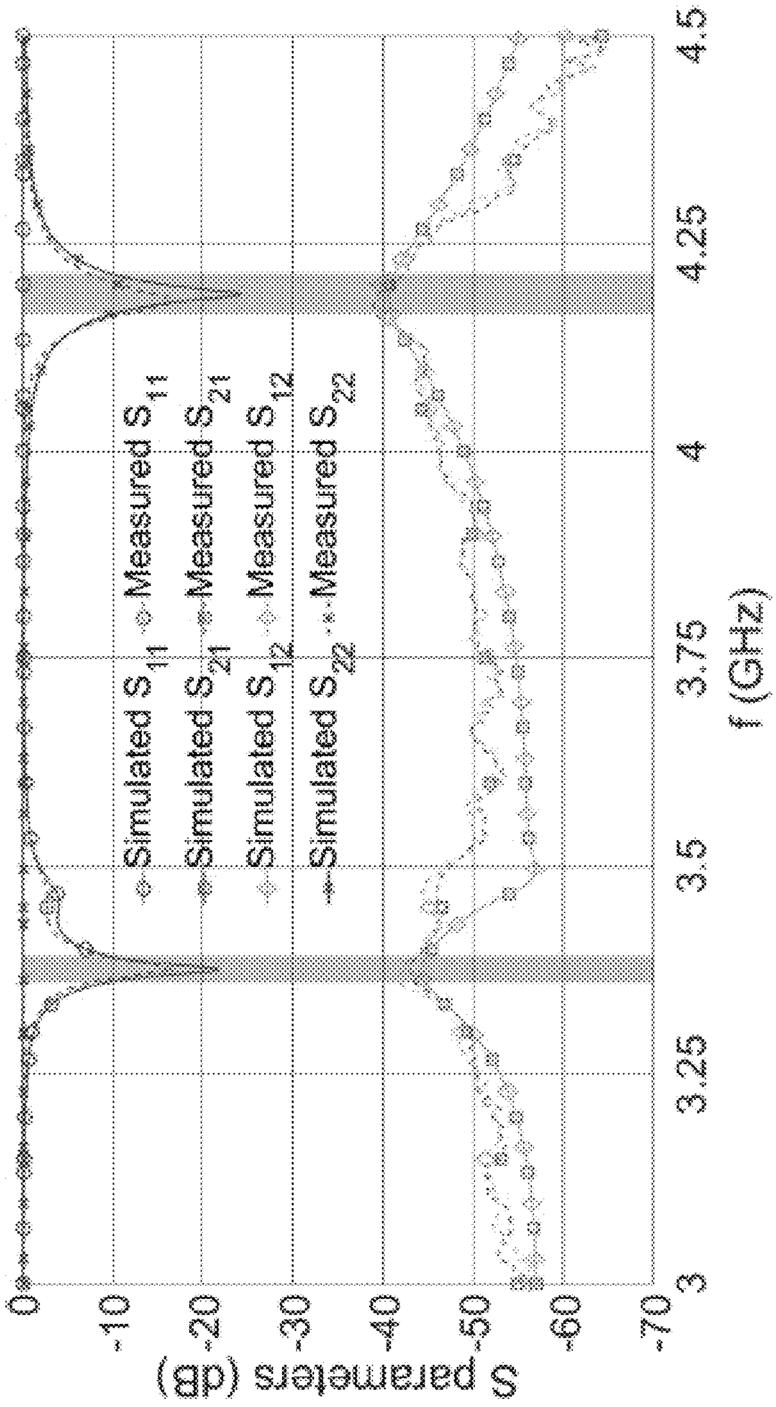
FIG. 8 shows a plot of simulated and measured scattering parameters (in dB) versus frequency (in GHz) for an SFMSA.
Figures 9A, 9B:
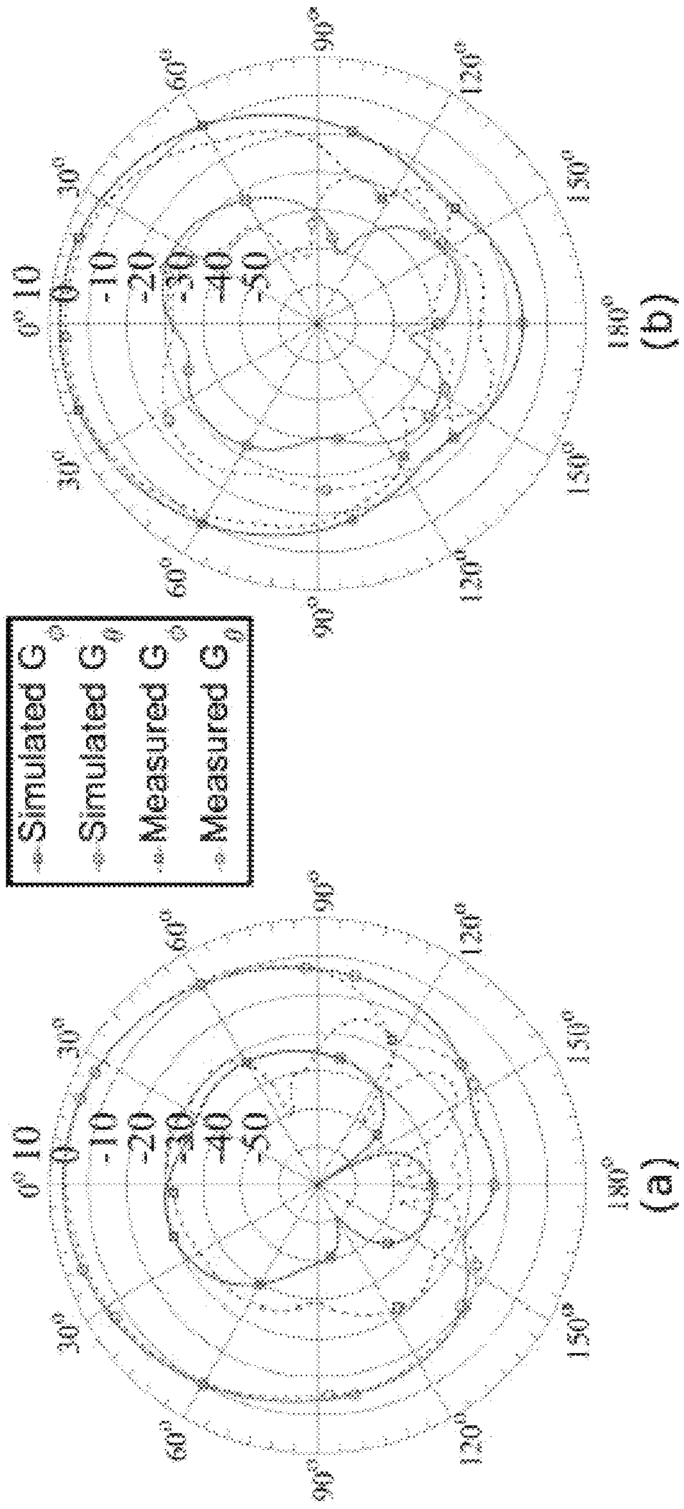
FIG. 9(*a*) simulated and measured gain patterns for an SFMSA operating in the center frequency of the low-band in the φ=90° principal plane (refer to the coordinate system defined in FIG. 3(*c*)).

For validation the SFMSA shown in FIG. 3(*c*) was fabricated using an LPKF S103 milling machine. The fabricated antenna is shown in FIG. 7 and the simulated and measured scattering parameters in FIG. 8. Excellent agreement was observed between simulated and measured results. The antenna's gain patterns were measured using an MVG near-field Starlab anechoic chamber at Florida International University (FIU). The simulated and measured gain patterns at the center frequencies of the low- and high-bands are shown in FIGS. 9(*a*) and 9(*b*), respectively. Based on the coordinate system in FIG. 3(*c*), FIG. 9(*a*) indicates that a y-polarized wave is radiated in the low-band, while FIG. 9(*b*) indicates that an x-polarized wave is radiated in the high-band. The SFMSA exhibits good in-band pattern stability in both the low- and high-bands. Therefore, gain patterns at different frequencies inside these bands are not shown here.

It is important to emphasize that improved isolation is typically achieved using enhanced feeding techniques or complex decoupling structures which are usually difficult to design and/or fabricate. Moreover, such structures typically increase the profile of the antenna or degrade its efficiency by absorb-ng power ([21]-[25]). Alternatively, in embodiments of the subject invention, the electromagnetic properties of a single slot are utilized and the current distributions of the desired modes are taken advantage of to provide high isolation and enhance the overall performance of the antenna. A comparison of the measured performance of the SFMSA to that of related art antennas is provided in Table 2. It is clear that the proposed design for decoupling modes achieves the highest isolation with gain, bandwidth, and cross polarization comparable to that of related art antennas.

TABLE 2

Comparative study of SFMSA.

| Parameter | | [31] | [32] | [33] | [34] | SFMSA |
|---|---|---|---|---|---|---|
| BW % | LB | 1.7 | 1.9 | 1.5 | 0.9 | 0.9 |
| | HB | 2.8 | 2.7 | 1.3 | 0.7 | 1.0 |
| $I_{min}$ (dB) | LB | 24.0 | 27.9 | 29.0 | 31.0 | 41.8 |
| | HB | 22.0 | 30.2 | 29 | 42 | 38.9 |
| $G_o$ (dB) | LB | 4.3 | 3.6 | 5.7 | 4 | 5.8 |
| | HB | 4.2 | 5.2 | 5.9 | 4.0 | 5.9 |
| X $P_o$ (dB) | LB | 19.0 | 35.0 | 30.0 | 20.0 | 21.8 |
| | HB | 19.0 | 35.0 | 27.0 | 20.0 | 21.9 |
| $e_o$ % | LB | — | — | — | — | 68 |
| | HB | — | — | — | — | 77 |
| Design Complexity | | Fair | Fair | Fair | Low | Low |

Example 2

Figures 10A, 10B:
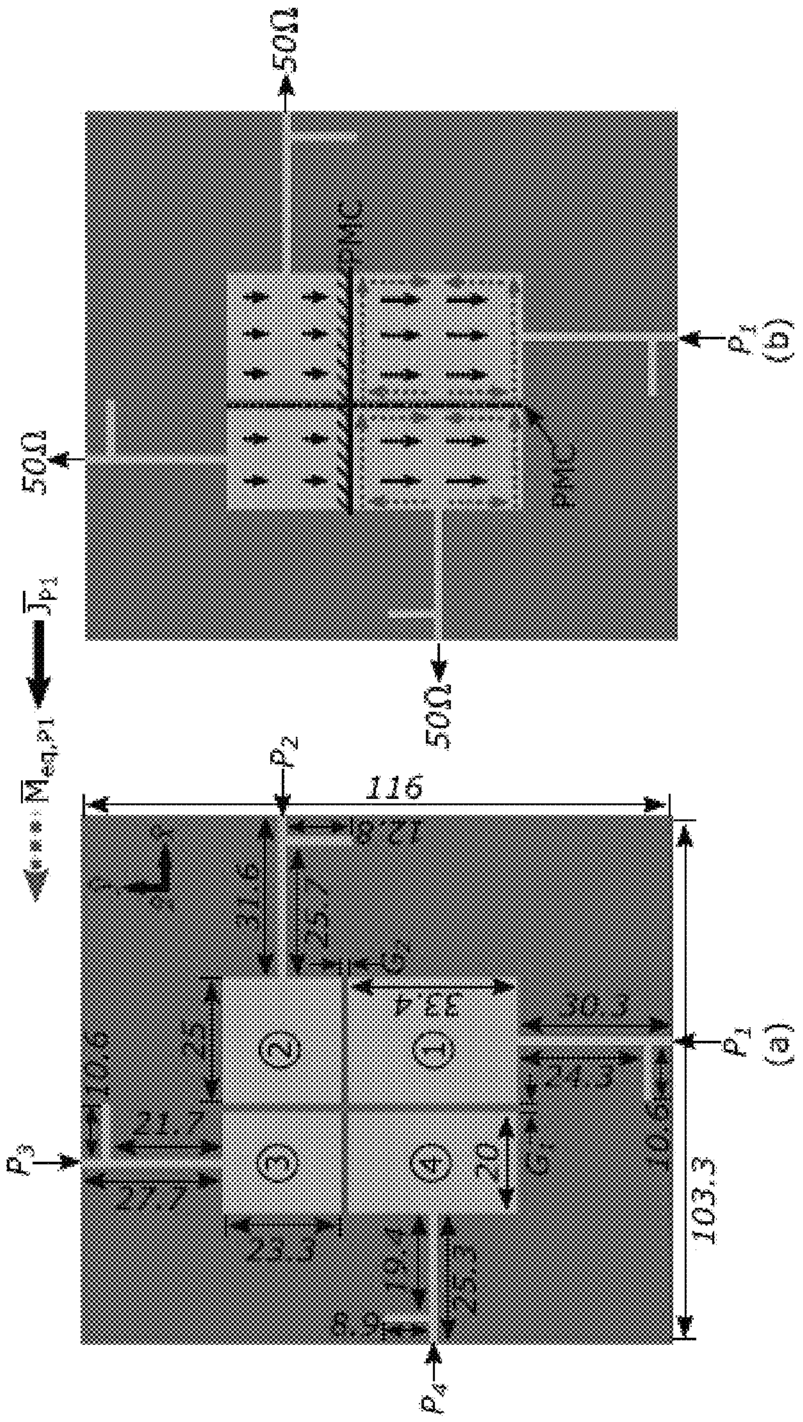
FIG. 10(*a*) shows a top view of a quad-band antenna, according to an embodiment of the subject invention. All dimensions are for exemplary purposes only, should not be construed as limiting, and are given in mm.

Two SFMSAs (FIG. 3(*c*)) were used as dual-band building blocks to design a quad-band antenna as shown in FIG. 10(*a*). The two slots, $G_1$ and $G_2$, are 1.35 mm wide and the four feeding ports, denoted as $P_1$ through $P_4$, are dedicated to excite each of the four bands: $B_1$, $B_2$, $B_3$, and $B_4$ at 2.56 GHz-2.58 GHz, 3.19 GHz-3.22 GHz, 3.52 GHz-3.55 GHz, and 4.05 GHz-4.1 GHz, respectively. As was the case with the SFMSA, only one port was excited at a time with all non-excited ports terminated in matched loads. The antenna operates in the $TM_{010}$ mode when either port $P_1$ or port $P_3$ is excited, and the antenna operates in the $TM_{100}$ mode when either port $P_2$ or port $P_4$ is excited.

The coupling properties of each slot, $G_1$ and $G_2$, are understood following the analysis given herein. When the antenna operates in the $TM_{010}$ mode (see also FIG. 2(*b*)), the slot $G_1$ appears "transparent," (FIG. 2(*h*)) while the slot $G_2$ effectively decouples the patch sections (FIG. 2(*e*)). Alternatively, when the antenna operates in the $TM_{100}$ mode the slot $G_2$ appears "transparent" (FIG. 2(*h*)) while the slot $G_1$ effectively decouples the patch sections (FIG. 2(*e*)). In order to demonstrate this, the surface electric and equivalent magnetic currents when port $P_1$ excites the $TM_{010}$ mode in band $B_1$ are shown in FIG. 10(*b*). Currents strongly couple across slot $G_1$, while slot $G_2$ effectively decouples the patches resulting in negligible currents being induced on patches 2 and 3. For emphasis the PMC placed in slot $G_1$ is represented as a dashed line while the PMC placed in $G_2$ is represented as a solid line. Due to the strong coupling between patches 1 and 4, the presence of patch 4 extends the effective radiating dimension of the $TM_{010}$ mode excited by port $P_1$ thereby reducing the input impedance. In fact, the slot is so "transparent" that the input impedance of port $P_1$ is approximately the same as the input impedance of a port feeding a continuous patch spanning both patches 1 and 4.

In summary, the resonant frequency of each patch is independently determined by its corresponding non-radiating dimension even in the presence of the other patches. However, the input impedance of each patch at its resonance is influenced only by the adjacent patch, which is separated by a "transparent" PMC plane. The design approach presented here can be used to design a quad-band antenna for any four frequency bands and provide high isolation between the bands. Notably, harmonic frequencies should be avoided in the multi-band designs as they can significantly decrease the isolation between neighboring bands. This guideline does not create a problem as communication systems typically avoid using the first harmonics of their bands.

Figure 11:
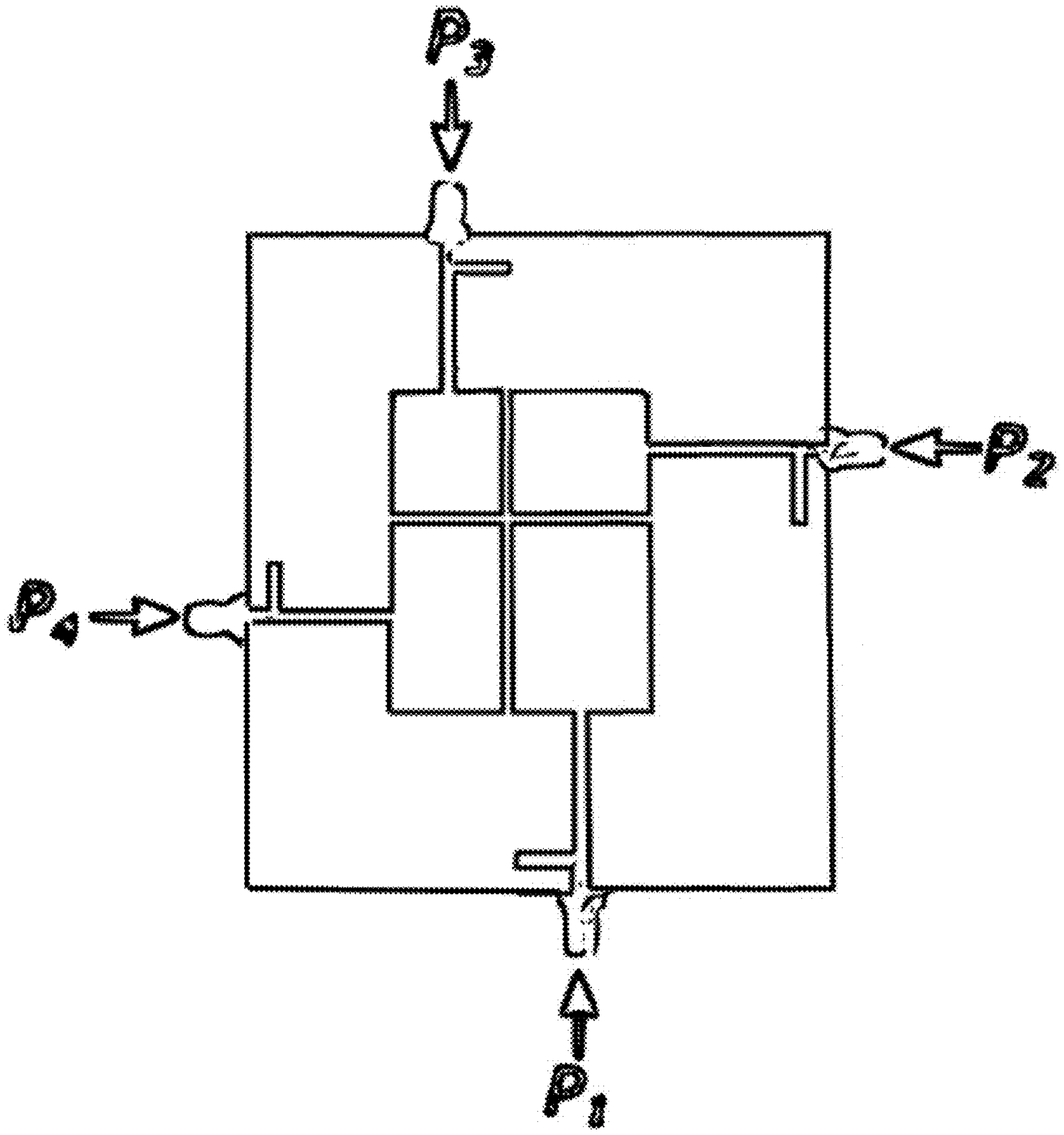
FIG. 11 shows an image of a fabricated quad-band antenna, according to an embodiment of the subject invention.
Figure 12:
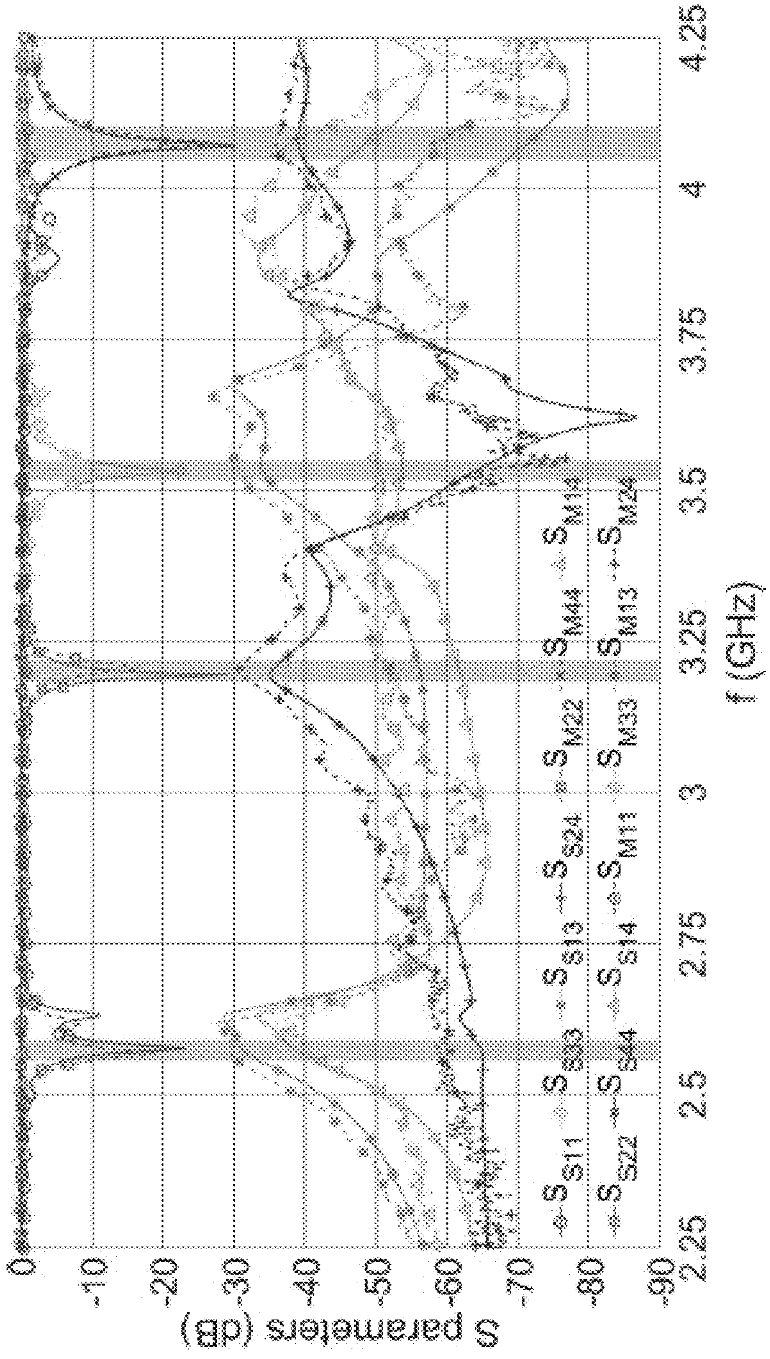
FIG. 12 shows a plot of simulated and measured scattering parameters ($S_{Sij}$ and $S_{Mij}$, in dB) versus frequency (in GHz) for a quad-band antenna.

The quad-band antenna was fabricated using an LPKF S103 milling machine. The fabricated antenna is shown in FIG. 11, and the simulated and measured scattering parameters are shown in FIG. 12. It can be seen that the measurements agree very well with simulations. Notably, only the most significant coupling terms are shown for brevity. It is observed that all four bands have a minimum measured in-band isolation of at least 30 dB. This low isolation between the ports is observed due to the decoupling properties introduced by the slots etched in our proposed design.

Figures 13A, 13B, 13C, 13D:
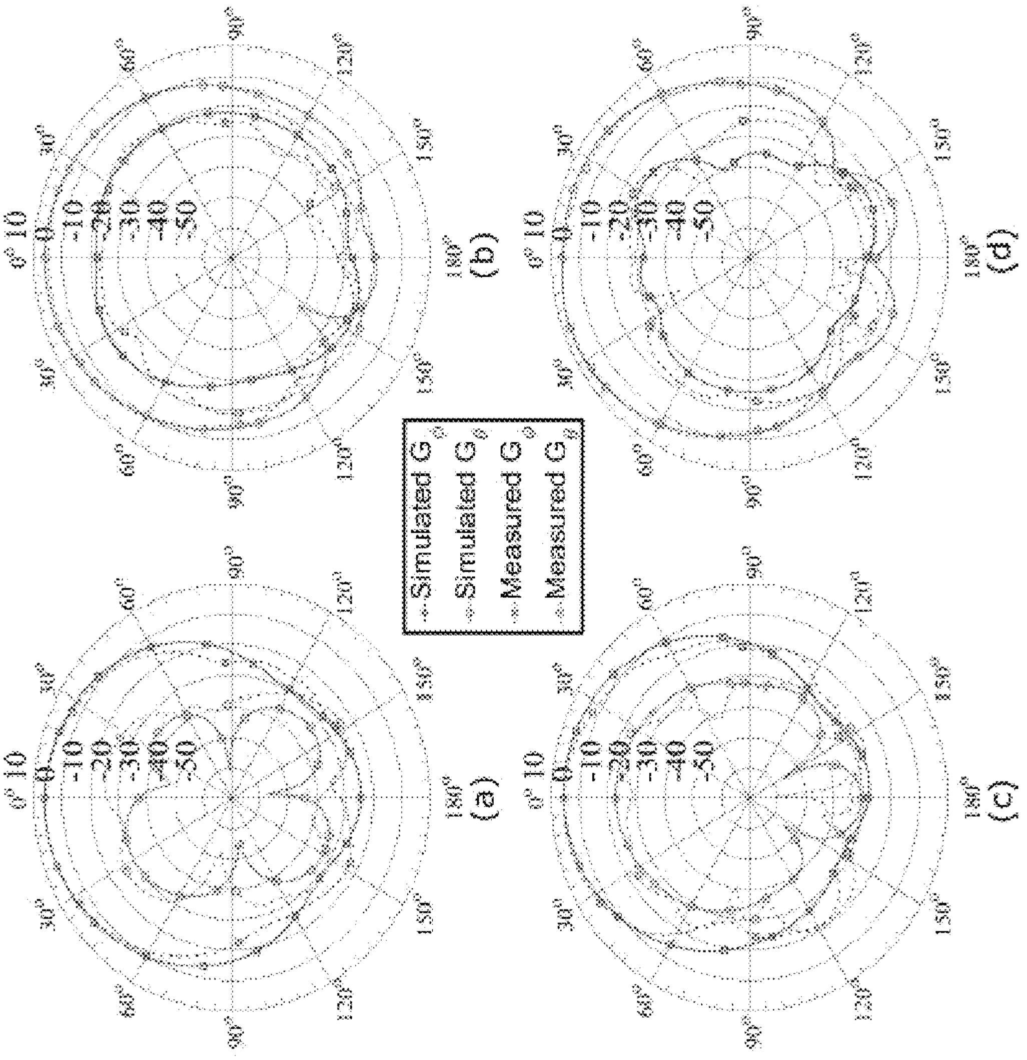
FIG. 13(*a*) shows simulated and measured gain patterns for a quad-band antenna operating in center frequency of band $B_1$ in the φ=0° principal plane (refer to the coordinate system defined in FIG. 10(*a*)).

FIGS. 13(*a*)-13(*d*) show the simulated and measured gain patterns at the center frequencies of bands $B_1$ through $B_4$. Based on the coordinate system in FIG. 10(*a*), FIGS. 13(*a*)-13(*d*) indicate that bands $B_1$ through $B_4$ radiate y-, x-, y-, and x-polarized waves, respectively. It should be noted that this antenna exhibits good in-band stability for both its simulated and measured patterns.

The measured performance of this quad-band antenna is tabulated in Table 3. These results show that the quad-band antenna achieves high isolation between all the bands of operation (greater than 30 dB), which is accomplished using our proposed method for decoupling modes. Further, all bands achieve boresight gains greater than 4.7 dB and boresight cross polarization levels greater than 13.8 dB. A comparison between the measured performance parameters of the quad-band antenna and related art antennas is provided in Table 4. It is clear that the proposed decoupling technique provides the highest isolation between all bands of operation. Even though the design proposed in [35] achieved improved boresight cross polarization levels and radiation efficiency, these come at the cost of increased design complexity.

TABLE 3

Measured quad-band antenna parameters.

| Band | BW (MHz) | $I_{min}$ (dB) | $G_o$ (dB) | X $P_o$ (dB) | $e_o$ % |
|---|---|---|---|---|---|
| 1 | 20 | 29.4 | 6 | 16.1 | 66 |
| 2 | 30 | 30.7 | 4.7 | 13.8 | 60 |
| 3 | 30 | 30 | 5.5 | 18.2 | 66 |
| 4 | 50 | 35.8 | 5.7 | 18.4 | 76 |

TABLE 4

Comparative study of quad-band antenna.

| Parameter | | [35] | [36] | Proposed |
|---|---|---|---|---|
| BW % | $B_1/B_2$ | 2.1/1.9 | 1.7/1.4 | 0.9/0.6 |
| | $B_3/B_4$ | 3.8/2.8 | 1.3/1.3 | 0.9/1.3 |
| $I_{min}$ (dB) | $B_1/B_2$ | 22.6/26.0 | 32.1/23.6 | 29.4/30.7 |
| | $B_3/B_4$ | 31.5/29.7 | 26.6/29.7 | 30.0/35.8 |
| $G_o$ (dB) | $B_1/B_2$ | 5.5/6.9 | 5.4/4.1 | 6.0/4.7 |
| | $B_3/B_4$ | 7.5/7.5 | 3.6/3.6 | 5.5/5.7 |
| X $P_o$ (dB) | $B_1/B_2$ | 29.6/29.5 | —/— | 16.1/13.8 |
| | $B_3/B_4$ | 38.2/24.7 | —/— | 18.2/18.4 |
| $e_o$ % | $B_1/B_2$ | >93/>93 | —/— | 66/60 |
| | $B_3/B_4$ | >93/>93 | —/— | 66/76 |
| Design Complexity | | Fair | Fair | Low |

An elegant method was presented for designing multi-band and multi-mode microstrip antennas with high isolation between their bands. Specifically, the method introduces gaps (extended slots) in multi-band patch antennas to highly isolate the bands. The operation mechanism of this design approach was qualitatively explained using field equivalence theory and image theory. The method was verified by presenting two designs, which were simulated, fabricated, and measured (Examples 1 and 2); namely, a dual-band and a quad-band MSA that achieved measured isolation greater than 39 dB and 30 dB, respectively. The proposed method preserves the low profile of microstrip antennas, and provides a simple way to design multi-band and multi-mode antennas, which are suitable for next-generation communication systems.

Example 3

A quad-band multiple-in, multiple-out (MIMO) microstrip patch antenna was proposed and comprises four rectangular patches operating at their dominant mode with edge-to-edge spacing of $0.0025\lambda_o$. The four patches operated at 750 megahertz (MHz), 1.35 GHz, 1.42 GHZ, and 2.07 GHz, respectively. It was shown that by appropriately positioning the patches in relation to each other, an isolation greater than 10 dB is achieved. The antenna is low profile, compact, simple to design and fabricate, and it is well suited for MIMO base station applications.

Figures 15A, 15B, 15C:
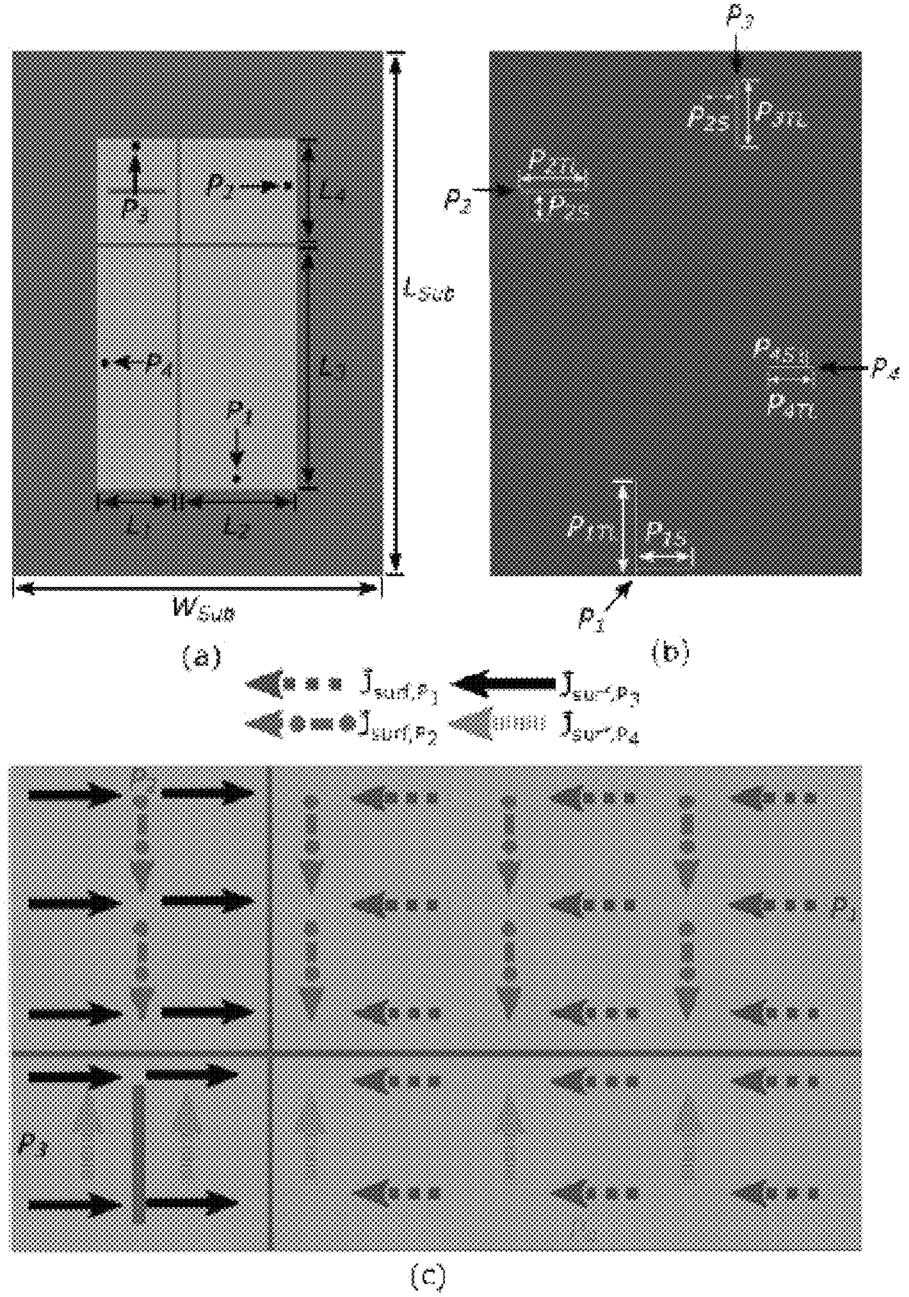
FIG. 15(*a*) shows a top view of a quad-band antenna, according to an embodiment of the subject invention.

Four MSAs operating at 750 MHZ, 1.35 GHz, 1.43 GHZ, and 2.07 GHz, respectively, were designed. Consider a rectangular patch MSA operating at its first two dominant modes. When a slot is cut parallel to the non-radiating edge, thereby creating a gap in the radiating edge, resonance is unaffected, as shown at a frequency $f_1$ in FIG. 14(*a*). However, when the slot is cut parallel to the radiating edge thereby creating a gap in the non-radiating edge, the current is confined, as shown at a frequency $f_2$ in FIG. 14(*b*). In this case, the resonant frequency corresponds to the contiguous non-radiating dimension. This concept is extended to the quad-band antenna shown in FIGS. 15(*a*)-15(*c*). Here, two 1 mm slots, $0.0025\lambda_o$-wide at 750 MHz, were introduced effectively creating four isolated MSAs. From the current distributions shown in FIG. 15(*c*), each port excites a dominant mode. The four ports are denoted as $P_1$ through $P_4$. The resonant frequency of each port is independently determined by its corresponding non-radiating dimension. Note that ports 1 and 3 share the same polarization and are orthogonally polarized with respect to ports 2 and 4. The design includes a 2.54 mm-thick upper substrate with MSAs and a 1.27 mm thick lower substrate with feeding networks separated by a ground plane. The upper substrate is Rogers RT/duroid 5880 with $\varepsilon_r$=2.2 and tan(δ)=0.0009. The lower substrate is Rogers RO3210 with $\varepsilon_r$=10.2 and tan(8)=0.003. The patches are fed using 0.6 mm diameter vias. All vias are offset from the edge of the patches by 3 mm. The vias connect the upper and lower substrates through 1 mm holes cut into the ground plane. As shown in FIG. 15(*b*), the vias connect to single stub matching networks. These networks are made using 50Ω lines. Further impedance matching is achieved using a slot as in the case where a 30 mm×2 mm slot is cut into the port 3 patch to tune its resonance without disturbing the matching of the other ports. Further dimensions are provided in Table 5. It is noted that the feeding networks presented in FIG. 15(*b*) are only to demonstrate the concept of the design; other networks, parameters, etc. can be used.

Figure 16:
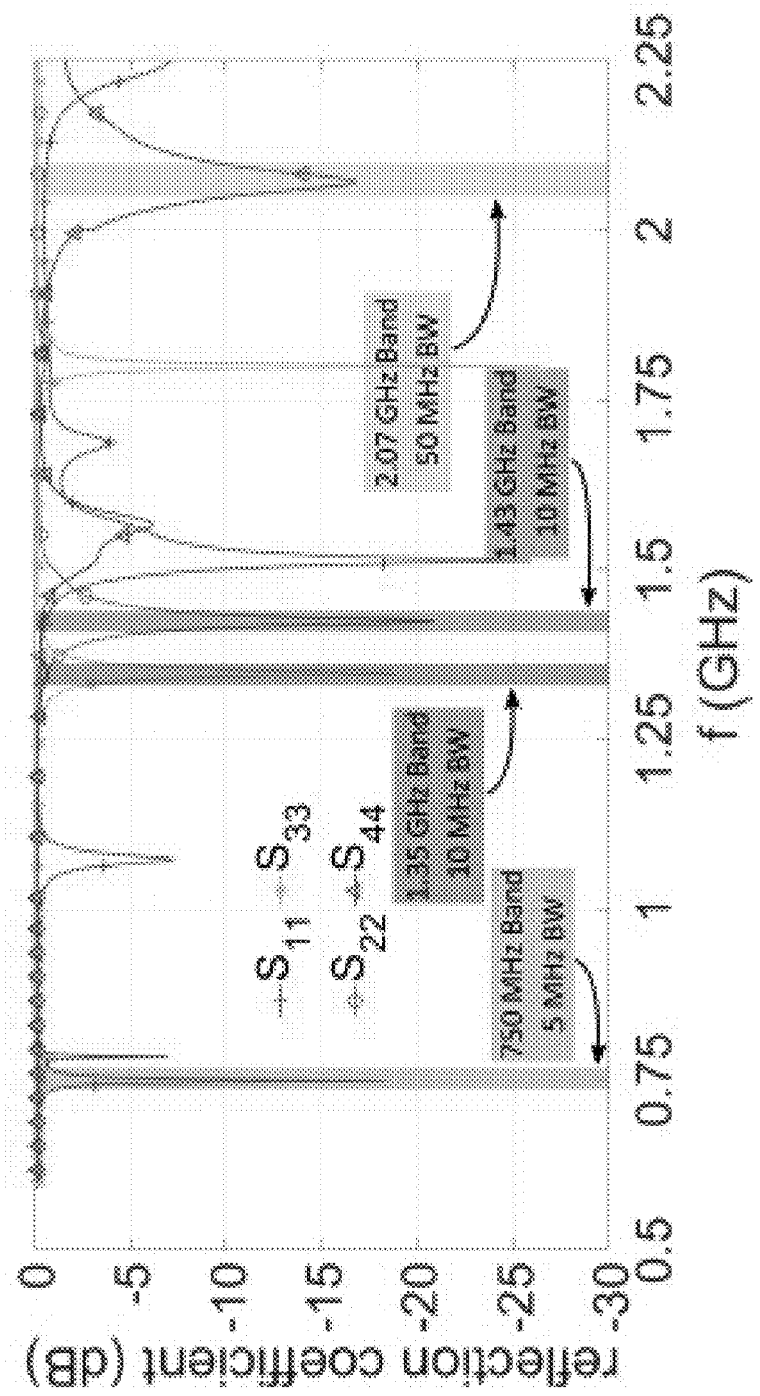
FIG. 16 shows a plot of reflection coefficient (in dB) versus frequency (in GHz) for all ports in a quad-band antenna.
Figures 17A, 17B:
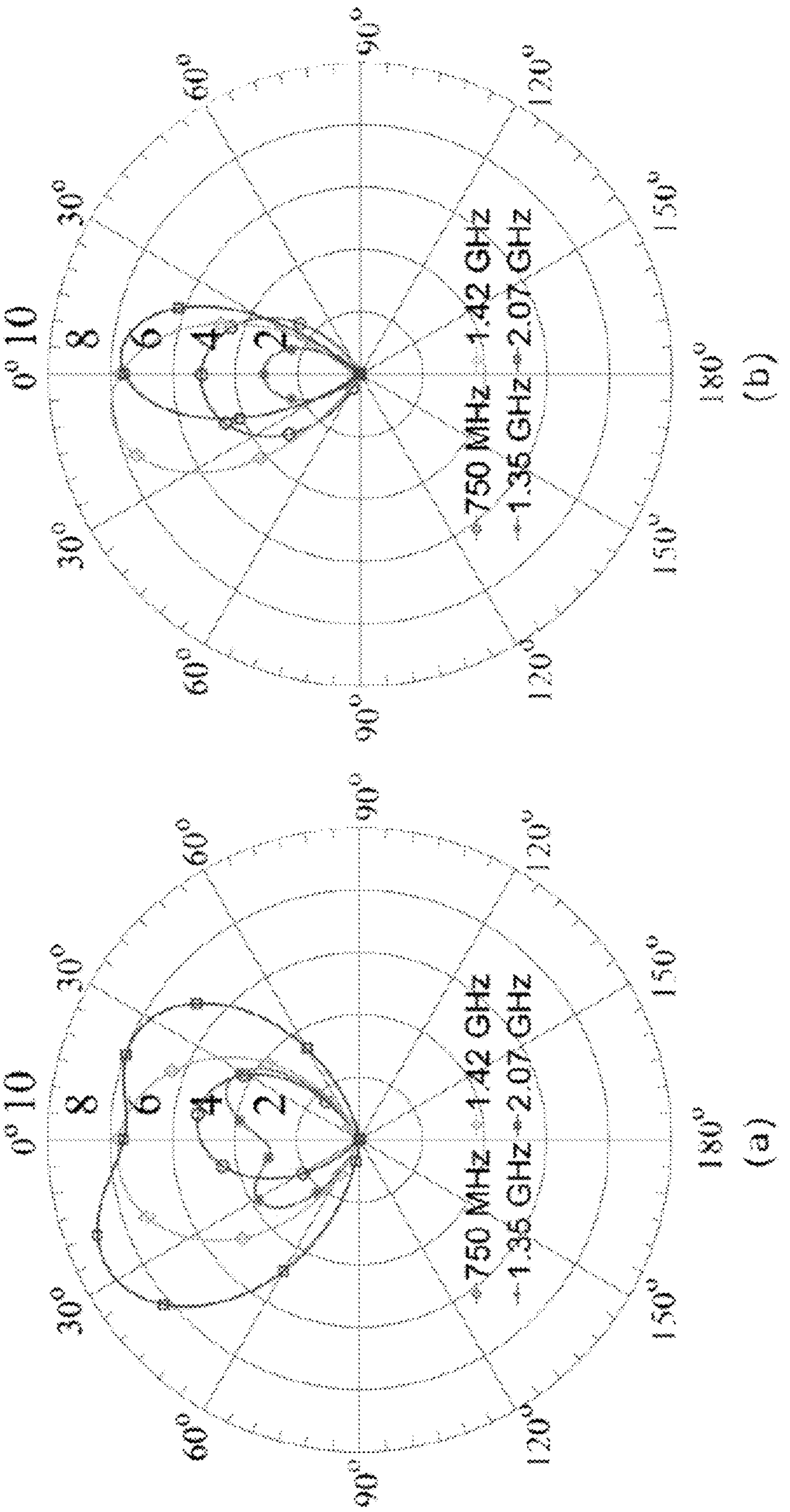
FIG. 17(*a*) shows gain patterns of all bands in the E-plane for a quad-band antenna.

The reflection coefficients of all the ports are shown in FIG. 16. Ports 1 through 4 operate at 750 MHz, 1.43 GHZ, 1.35 GHZ, and 2.07 GHz, respectively, as indicated by the highlighted bands. Note that each port has undesired resonances corresponding to higher modes. Although a plot of the isolation between all the ports is not presented, the isolation between all ports is greater than 10 dB, which is considered sufficient for MIMO operation. The antenna gain patterns are shown in FIGS. 17(*a*)-17(*b*). Note that all the gain patterns are affected by the presence of the other MSAs. Although the coupling between all the ports is low, power is still coupled and re-radiated by the adjacent patches resulting in these effects. The fields radiated by the coupled patches reduce the cross polarization levels. The maximum cross polarization levels are −18.2 dB, −10.7 dB, −11.8 dB, and −11.6 dB at 750 MHz, 1.35 GHZ, 1.42 GHz, and 2.07 GHz, respectively. Note that the tuning slot caused a reduction in gain at port 3. Therefore, it was shown that through appropriate relative positioning of the patches an isolation greater than 10 dB is obtained between ports.

TABLE 5

Antenna Parameters

| Parameter | Value (mm) | Parameter | Value (mm) |
|---|---|---|---|
| $L_1$ | 42.9 | $P_{1S}$ | 30.6 |
| $L_2$ | 63 | $P_{2TL}$ | 36.2 |
| $L_3$ | 130 | $P_{2S}$ | 15.3 |
| $L_4$ | 56.4 | $P_{3TL}$ | 36.6 |
| $L_{sub}$ | 279 | $P_{3S}$ | 17.5 |
| $W_{sub}$ | 198.5 | $P_{4TL}$ | 25 |
| $P_{1TL}$ | 51.1 | $P_{4S}$ | 8.8 |

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

What is claimed is:

1. A multi-band antenna, comprising:

a substrate;

a first patch antenna disposed on an upper surface of the substrate;

a second patch antenna disposed on the upper surface of the substrate and physically separated from the first patch antenna by a gap;

a first connector for connecting to an external power source or a load;

a second connector for connecting to the external power source or the load;

a first conductive line disposed on the upper surface of the substrate, the first conductive line being in direct physical contact with the first patch antenna and the first connector, and the first conductive line electrically connecting the first patch antenna and the first connector; and a second conductive line disposed on the upper surface of the substrate, the second conductive line being in direct physical contact with the second patch antenna and the second connector, and the second conductive line electrically connecting the second patch antenna and the second connector, the first connector being disposed at a first edge of the substrate, and the second connector being physically separated from the first connector and disposed at a second edge of the substrate different from the first edge.

2. The multi-band antenna according to claim 1, the first patch antenna and the second patch antenna being made of a same material.

3. The multi-band antenna according to claim 1, a cross-section of the first patch antenna, taken in a first plane parallel to the upper surface of the substrate, having a rectangular shape, and a cross-section of the second patch antenna, taken in the first plane, having a rectangular shape.

4. The multi-band antenna according to claim 1, the first patch antenna comprising four sides including a first side facing the second patch antenna and being closest to the second patch antenna out of the four sides of the first patch antenna, the second patch antenna comprising four sides including a second side facing the first patch antenna and being closest to the first patch antenna out of the four sides of the second patch antenna, and a length of the first side of the first patch antenna being equal to a length of the second side of the second patch antenna.

5. The multi-band antenna according to claim 1, the gap being a smallest distance between the first patch antenna and the second patch antenna, measured in a first direction parallel to the upper surface of the substrate, a length of the first patch antenna, measured in the first direction, being at least 3 times larger than the gap, and a length of the second patch antenna, measured in the first direction, being at least 3 times larger than the gap.

6. The multi-band antenna according to claim 5, the length of the first patch antenna, measured in the first direction, being at least 5 times larger than the gap, and the length of the second patch antenna, measured in the first direction, being at least 5 times larger than the gap.

7. The multi-band antenna according to claim 5, the length of the first patch antenna, measured in the first direction, being at least 10 times larger than the gap, and the length of the second patch antenna, measured in the first direction, being at least 10 times larger than the gap.

8. The multi-band antenna according to claim 5, the length of the first patch antenna, measured in the first direction, being at least 1.25 times larger than the length of the second patch antenna, measured in the first direction.

9. The multi-band antenna according to claim 1, the substrate comprising the first edge, the second edge adjacent to the first edge, a third edge opposite from the first edge and adjacent to the second edge, and a fourth edge adjacent to the third edge and the first edge and opposite from the second edge, the first conductive line extending from the first patch antenna towards the first edge of the substrate, and the second conductive line extending from the second patch antenna towards the second edge of the substrate.

10. The multi-band antenna according to claim 9, the first conductive line extending such that the first conductive line is parallel to the second edge of the substrate and the fourth edge of the substrate, and the second conductive line extending such that the second conductive line is parallel to the first edge of the substrate and the third edge of the substrate.

11. The multi-band antenna according to claim 1, the multi-band antenna operating in a first band of operation when the first connector is connected to the external power source and the second connector is connected to the load, and the multi-band antenna operating in a second band of operation when the first connector is connected to the load and the second connector is connected to the external power source.

12. A multi-band antenna, comprising:

a substrate;

a first patch antenna disposed on an upper surface of the substrate;

a second patch antenna disposed on the upper surface of the substrate and physically separated from the first patch antenna by a first gap;

a third patch antenna disposed on the upper surface of the substrate and physically separated from the second patch antenna by a second gap;

a fourth patch antenna disposed on the upper surface of the substrate and physically separated from the third patch antenna by a third gap and physically separated from the first patch antenna by a fourth gap;

a first connector for connecting to an external power source or a load;

a second connector for connecting to the external power source or the load;

a third connector for connecting to the external power source or the load;

a fourth connector for connecting to the external power source or the load;

a first conductive line disposed on the upper surface of the substrate, the first conductive line being in direct physical contact with the first patch antenna and the first connector, and the first conductive line electrically connecting the first patch antenna and the first connector;

a second conductive line disposed on the upper surface of the substrate, the second conductive line being in direct physical contact with the second patch antenna and the second connector, and the second conductive line electrically connecting the second patch antenna and the second connector;

a third conductive line disposed on the upper surface of the substrate, the third conductive line being in direct physical contact with the third patch antenna and the third connector, and the third conductive line electrically connecting the third patch antenna and the third connector; and a fourth conductive line disposed on the upper surface of the substrate, the fourth conductive line being in direct physical contact with the fourth patch antenna and the fourth connector, and the fourth conductive line electrically connecting the fourth patch antenna and the fourth connector, the first connector being disposed at a first edge of the substrate, the second connector being physically separated from the first connector and disposed at a second edge of the substrate different from the first edge, the third connector being physically separated from the first connector and the second connector, and disposed at a third edge of the substrate different from the first edge and the second edge, and the fourth connector being physically separated from the first connector, the second connector, and the third connector, and disposed at a fourth edge of the substrate different from the first edge, the second edge, and the third edge.

13. The multi-band antenna according to claim 12, the first patch antenna, the second patch antenna, the third patch antenna, and the fourth patch antenna being made of a same material.

14. The multi-band antenna according to claim 12, a cross-section of the first patch antenna, taken in a first plane parallel to the upper surface of the substrate, having a rectangular shape, a cross-section of the second patch antenna, taken in the first plane, having a rectangular shape, a cross-section of the third patch antenna, taken in the first plane, having a rectangular shape, and a cross-section of the fourth patch antenna, taken in the first plane, having a rectangular shape.

15. The multi-band antenna according to claim 12, the first patch antenna comprising four sides including a first side facing the second patch antenna and being closest to the second patch antenna out of the four sides of the first patch antenna, and a second side facing the fourth patch antenna and being closest to the fourth patch antenna out of the four sides of the first patch antenna, the second patch antenna comprising four sides including a third side facing the first patch antenna and being closest to the first patch antenna out of the four sides of the second patch antenna, and a fourth side facing the third patch antenna and being closest to the third patch antenna out of the four sides of the second patch antenna, the third patch antenna comprising four sides including a fifth side facing the second patch antenna and being closest to the second patch antenna out of the four sides of the third patch antenna, and a sixth side facing the fourth patch antenna and being closest to the fourth patch antenna out of the four sides of the third patch antenna the fourth patch antenna comprising four sides including a seventh side facing the third patch antenna and being closest to the third patch antenna out of the four sides of the fourth patch antenna, and an eight side facing the first patch antenna and being closest to the first patch antenna out of the four sides of the fourth patch antenna, a length of the first side of the first patch antenna being equal to a length of the third side of the second patch antenna, a length of the fourth side of the second patch antenna being equal to a length of the fifth side of the third patch antenna, a length of the sixth side of the third patch antenna being equal to a length of the seventh side of the fourth patch antenna, and a length of the eighth side of the fourth patch antenna being equal to a length of the second side of the first patch antenna.

16. The multi-band antenna according to claim 12, the first gap being a smallest distance between the first patch antenna and the second patch antenna, measured in a first direction parallel to the upper surface of the substrate, the second gap being a smallest distance between the second patch antenna and the third patch antenna, measured in a second direction parallel to the upper surface of the substrate, the third gap being a smallest distance between the third patch antenna and the fourth patch antenna, measured in the first direction, the fourth gap being a smallest distance between the fourth patch antenna and the first patch antenna, measured in the second direction, a length of the first patch antenna, measured in the first direction, being at least 3 times larger than the first gap, a length of the second patch antenna, measured in the first direction, being at least 3 times larger than the first gap, a length of the second patch antenna, measured in the second direction, being at least 3 times larger than the second gap, a length of the third patch antenna, measured in the second direction, being at least 3 times larger than the second gap, a length of the third patch antenna, measured in the first direction, being at least 3 times larger than the third gap, a length of the fourth patch antenna, measured in the first direction, being at least 3 times larger than the third gap, a length of the fourth patch antenna, measured in the second direction, being at least 3 times larger than the fourth gap, and a length of the first patch antenna, measured in the first direction, being at least 3 times larger than the fourth gap.

17. The multi-band antenna according to claim 16, the length of the first patch antenna, measured in the first direction, being at least 1.25 times larger than the length of the second patch antenna, measured in the first direction, the length of the fourth patch antenna, measured in the first direction, being at least 1.25 times larger than the length of the third patch antenna, measured in the first direction, the length of the first patch antenna, measured in the first direction, being the same as the length of the fourth patch antenna, measured in the first direction, and the length of the second patch antenna, measured in the first direction, being the same as the length of the third patch antenna, measured in the first direction.

18. The multi-band antenna according to claim 12, the substrate comprising the first edge, the second edge adjacent to the first edge, the third edge opposite from the first edge and adjacent to the second edge, and the fourth edge adjacent to the third edge and the first edge and opposite from the second edge, the first conductive line extending from the first patch antenna towards the first edge of the substrate, the second conductive line extending from the second patch antenna towards the second edge of the substrate, the third conductive line extending from the third patch antenna towards the third edge of the substrate, the fourth conductive line extending from the fourth patch antenna towards the fourth edge of the substrate, the first conductive line extending such that the first conductive line is parallel to the second edge of the substrate and the fourth edge of the substrate, the second conductive line extending such that the second conductive line is parallel to the first edge of the substrate and the third edge of the substrate, the third conductive line extending such that the third conductive line is parallel to the second edge of the substrate and the fourth edge of the substrate, and the fourth conductive line extending such that the fourth conductive line is parallel to the first edge of the substrate and the third edge of the substrate.

19. The multi-band antenna according to claim 12, the multi-band antenna operating in a first band of operation when the second connector is connected to the load and the first connector is connected to the external power source, the multi-band antenna operating in a second band of operation when the first connector is connected to the load and the second connector is connected to the external power source, the multi-band antenna operating in a third band of operation when the second connector is connected to the load and the third connector is connected to the external power source, and the multi-band antenna operating in a fourth band of operation when the third connector is connected to the load and the fourth connector is connected to the external power source.

20. A multi-band antenna, comprising:

a substrate;

a first patch antenna disposed on an upper surface of the substrate;

a second patch antenna disposed on the upper surface of the substrate and physically separated from the first patch antenna by a gap;

a first connector for connecting to an external power source or a load;

a second connector for connecting to the external power source or the load;

a first conductive line disposed on the upper surface of the substrate, the first conductive line being in direct physical contact with the first patch antenna and the first connector, and the first conductive line electrically connecting the first patch antenna and the first connector; and a second conductive line disposed on the upper surface of the substrate, the second conductive line being in direct physical contact with the second patch antenna and the second connector, and the second conductive line electrically connecting the second patch antenna and the second connector, the first patch antenna and the second patch antenna being made of a same material, a cross-section of the first patch antenna, taken in a first plane parallel to the upper surface of the substrate, having a rectangular shape, a cross-section of the second patch antenna, taken in the first plane, having a rectangular shape, the first patch antenna comprising four sides including a first side facing the second patch antenna and being closest to the second patch antenna out of the four sides of the first patch antenna, the second patch antenna comprising four sides including a second side facing the first patch antenna and being closest to the first patch antenna out of the four sides of the second patch antenna, a length of the first side of the first patch antenna being equal to a length of the second side of the second patch antenna, the gap being a smallest distance between the first patch antenna and the second patch antenna, measured in a first direction parallel to the upper surface of the substrate, a length of the first patch antenna, measured in the first direction, being at least 5 times larger than the gap, and a length of the second patch antenna, measured in the first direction, being at least 5 times larger than the gap, the length of the first patch antenna, measured in the first direction, being at least 1.25 times larger than the length of the second patch antenna, measured in the first direction, the substrate comprising a first edge, a second edge adjacent to the first edge, a third edge opposite from the first edge and adjacent to the second edge, and a fourth edge adjacent to the third edge and the first edge and opposite from the second edge, the first connector being disposed at the first edge of the substrate, the second connector being disposed at the second edge of the substrate, the first conductive line extending from the first patch antenna towards the first edge of the substrate, the second conductive line extending from the second patch antenna towards the second edge of the substrate, the first conductive line extending such that the first conductive line is parallel to the second edge of the substrate and the fourth edge of the substrate, the second conductive line extending such that the second conductive line is parallel to the first edge of the substrate and the third edge of the substrate, the multi-band antenna operating in a first band of operation when the first connector is connected to the external power source and the second connector is connected to the load, and the multi-band antenna operating in a second band of operation when the first connector is connected to the load and the second connector is connected to the external power source.

* * * * *